United States Patent [19]

Tada et al.

[11] Patent Number: 5,526,697
[45] Date of Patent: Jun. 18, 1996

[54] DYNAMIC LOAD SENSING METHOD, DYNAMIC LOAD ANALYZING SENSOR, AND LOAD MEASUREMENT EQUIPMENT USING SAID SENSING METHOD AND SAID ANALYZING SENSOR

[75] Inventors: Eiichi Tada, Izumi; Kazuo Watanabe, Amagasaki, both of Japan

[73] Assignee: Kyoei Automatic Control Technology Co., Ltd., Hyogo, Japan

[21] Appl. No.: 39,491

[22] PCT Filed: Aug. 27, 1992

[86] PCT No.: PCT/JP92/01094

§ 371 Date: Apr. 30, 1993

§ 102(e) Date: Apr. 30, 1993

[87] PCT Pub. No.: WO93/05371

PCT Pub. Date: Mar. 18, 1993

[51] Int. Cl.$^6$ .................................................. G01L 1/04
[52] U.S. Cl. .................... 73/862.634; 73/862.041
[58] Field of Search ...................... 73/602, 862.41, 73/862.639, 862.634, 862.632, 862.625, 862.041, 862.626

[56] References Cited

U.S. PATENT DOCUMENTS 4,212,197  7/1980  Kawai et al. ...................... 73/862.634
5,339,697  8/1994  Mullin .............................. 73/862.041

Primary Examiner—Richard Chilcot
Assistant Examiner—Max Noori
Attorney, Agent, or Firm—Burns, Doane, Swecker & Mathis

[57] ABSTRACT

A method and apparatus for measuring a load under a dynamic state where variations such as swinging and vibration exist. One of the ends of a member constituting a spring system is fixed with the other end free. A stationary load We is calculated in accordance with equation $$W_e = \frac{W_i g}{g + \Delta g_{(A/L)i}} - \frac{k \cdot y_i \cdot g \cdot \Delta g_{(A/L)i}}{\{g + \Delta g_{(A/L)i}\}^2}$$

by attaching a load to the free end and measuring the instantaneous displacement Yi. In the above equation, Wi is the instantaneous load, g is gravitational acceleration, $g_{(A/L)i}$ is the acceleration of the free end obtained by differentiating twice the displacement Yi, and k is a spring constant. When a base to which the member constituting the spring system is fixed undergoes variations such as swinging and vibration the stationary load We is determined by $$W_e = \frac{W_i g}{g + \Delta g_{(A/L)i} - \Delta g_{(G/L)i}} - \frac{k \cdot y_i \cdot g \cdot (\Delta g_{(A/L)i} - \Delta g_{(G/L)i})}{\{g + \Delta g_{(A/L)i} - \Delta g_{(G/L)i}\}^2}$$

where $g_{(G/L)i}$ is the acceleration of variation of the base.

26 Claims, 20 Drawing Sheets

Fig. 6(A)
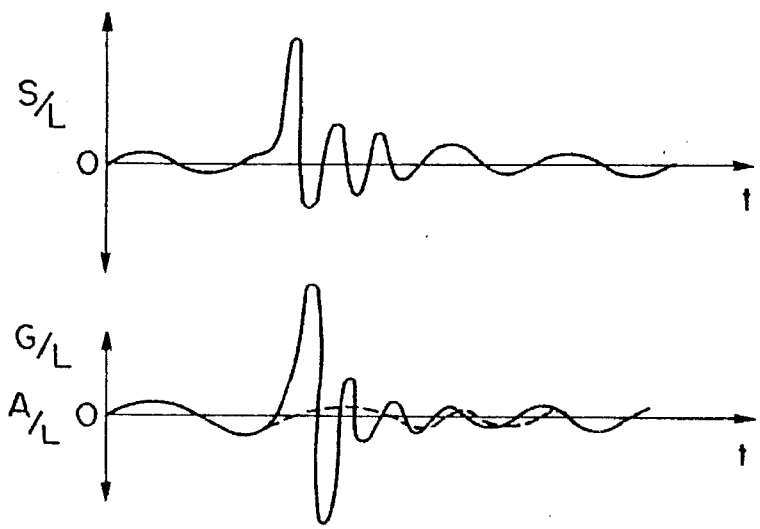
Fig. 6(B)
Fig. 7
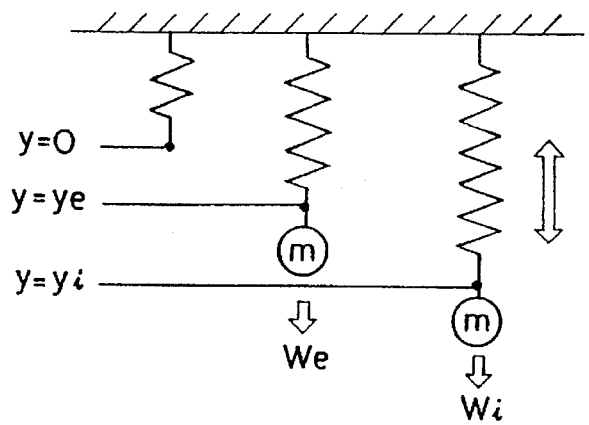
Fig. 8
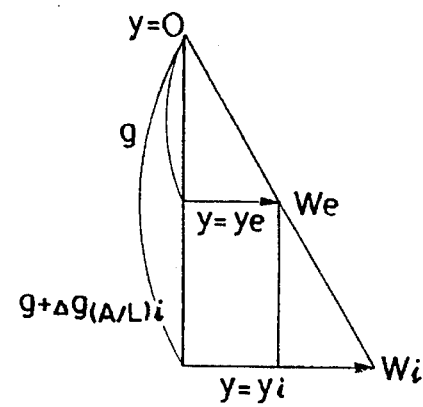
Fig. 9
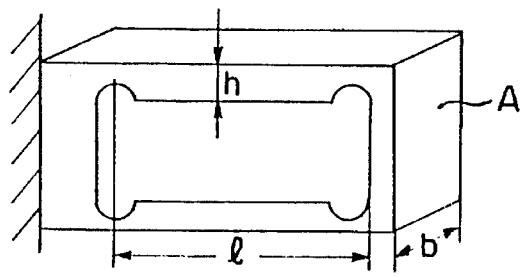

DYNAMIC LOAD SENSING METHOD, DYNAMIC LOAD ANALYZING SENSOR, AND LOAD MEASUREMENT EQUIPMENT USING SAID SENSING METHOD AND SAID ANALYZING SENSOR

FIELD OF THE INVENTION

The present invention relates to dynamic load sensing method, dynamic load analyzing sensor and load measurement equipment using the sensing method and the analyzing sensor for time-varying forces under dynamic state excited by shaking, oscillating and/or vibrating conditions.

BACKGROUND OF THE INVENTION

Up to now, many ideas have been proposed about load measurement of a time-varying force under dynamic states excited by shaking, oscillating and/or vibrating conditions. However, conventional load measurement methods and equipments are for measuring a static force or a quasidynamic force at measuring state conditions, over a long range period of about 1 second period, with a small acceleration depending on less than one G. Such conventional dynamic load measurements are not beyond a range of a static load measurement.

At first, conventional load sensors are described as a presupposition. A conventional load sensor is set up on a perfectly still base that and that a measuring load is constant and a time-independent force and that a measuring object is softly placed on the fixed measuring equipment, like a conventional scale.

In a conventional static load sensor, as shown in FIG. 1(A), the load measurement sensor assembly A is rigidly supported by a still fixed base B, and the measuring object C of the mass m is softly put on the sensor assembly A. This system forms a uniform motion coordinate, and the force F is given by the equation, $F=mg$ ($N=Kgm/s^2$), where g is a gravitational acceleration ($m/s^2$). The static load S/L is time-constant and is independent of the measuring time, shown in FIG. 1(B). In FIG. 1(C) the acceleration A/L of the sensor assembly A is zero at all times.

Considering the case where the spring-mass load measurement equipment in FIG. 1(A) is subjected to a suddenly applied constant force, the sensor assembly A is set to vibrating by the suddenly applied dynamic force, such as by dropping the load measurement object C from an upper side to the sensor assembly A. The vibration and acceleration, whose plot against time is shown in FIGS. 2(A) and (B) is excited at a free edge of the sensor assembly A on the beam. The vibration of the free edge is attenuated by damping forces by the material and the structure of the beam that is composed for sensor assembly A. The damping forces extinguish the vibration in time. At last the external force is time-constant. In this condition the time-constant load can be measured. The same analogy is true for measuring a weight of human by a conventional scale.

Considering the case that the load measurement equipment in FIG. 1(A) is acted by a suddenly applied impulsive load that is excited by a moving object such as an automobile passing over the sensor assembly A, the time acted upon by an impulsive load is so short that the vibration and acceleration remain at the sensor assembly A. Since the vibration and acceleration of the sensor assembly A eventually die out in time and decrease to zero as shown in FIGS. 3(A) and (B), it is impossible to measure the load of the object.

Considering the case of the load measurement that the base B in FIG. 1(A) is subjected to a time-varying displacement, the load sensor in FIG. 1(A) is set up at a time-varying base B that is excited by external vibrating and oscillating forces as shown in FIG. 4(A). The measuring object C of the mass m is softly put on the sensor assembly A. This system forms a non-uniform motion coordinate. Since the displacement of base B' is time-varying, the measuring load is not constant. The acceleration G/L of the base B' in FIG. 4(B) is produced by external time-varying forces. The sensor assembly A is vibrated by an acceleration G/L of the base B' and an acceleration A/L of the sensor assembly A. Further the acceleration A/L excited by vibrations of the sensor assembly A is plotted by a solid line, and the acceleration G/L of the base B' is plotted by a break line.

Considering the case of the load measurement that the base B' in FIG. 4(A) is subjected to a time-varying displacement and that the sensor assembly A is acted on by a suddenly applied step and constant force, the load sensor assembly A in FIG. 4(A) is vibrated both by a time-varying base B' that is excited by external vibrating and oscillating forces and by a suddenly applied step force. Since the suddenly applied step vibration of the sensor assembly A eventually die out in time and decrease to zero by a damping effect. However the vibration by a time-varying base B' remains during action by an external force. As a result, it is impossible to measure exactly the load of the object as shown in FIG. 5(A). The acceleration of the sensor assembly B' is only excited by the external time-varying vibration. It is impossible to measure the load by only the acceleration of the object. The acceleration A/L excited by vibrations of the sensor assembly A is plotted by a solid line, and the acceleration G/L of the base B' is plotted by a break line as shown FIG. 5(B).

Considering the case of the load measurement that the base B' in FIG. 4(A) is subjected to a time-varying displacement and that the sensor assembly A is acted on by a suddenly applied impulsive force, the load sensor assembly A in FIG. 4(A) is vibrated both by a time-varying base B' that is excited by external vibrating and oscillating forces and by a suddenly applied impulsive force. In this case, the time acted upon by an impulsive load is so short that the vibration and acceleration of the sensor assembly A by the impulsive force eventually die out in time and decrease to zero as shown in FIG. 4(A). The vibration by a time-varying base B' remains during action by an external force. As a result, it is impossible to measure exactly the load of the object as shown in FIG. 4(A). The acceleration of the sensor assembly B' is only excited by the external time-varying vibration as shown in FIG. 6(A). It is impossible to measure the load by only the acceleration of the object. The acceleration A/L excited by vibrations or the sensor assembly A is plotted by a solid line, and the acceleration G/L of the base B' is plotted by a break line as shown in FIG. 6(A).

DISCLOSURE OF THE INVENTION

The present invention has as its purpose the solution of the above mentioned problems. In the following, an instant displacement and an instant load are defined by a displacement and a load at any time during measuring, respectively. The rest load is defined by a load when the entire system is at rest at all times and that a load is a time-constant force.

The dynamic load measurement method comprises fixing an edge of a structure composed by a spring-mass system, another edge being free, measuring an instant displacement Yi by working a load at the free edge, transforming said instant displacement Yi to an instant load Wi by using a predetermined relation, an acceleration $\Delta g_{(A/L)i}$ from the second-order derivative with respect to time of said displacement Yi, a rest load We being calculated from the following equation, $$W_e = \frac{W_i g}{g + \Delta g_{(A/L)i}} - \frac{k \cdot y_i \cdot g \cdot \Delta g_{(A/L)i}}{\{g + \Delta g_{(A/L)i}\}^2}$$

where g is the gravitational acceleration, and is a spring constant.

The dynamic load measurement equipment comprises a member fixing an edge of a structure composed by a spring-mass system, another edge being free, and a displacement sensor measuring a displacement Yi at the free edge of the frame body, and a computing method of transforming the displacement Yi to a rest load We.

The principle of measuring a dynamic load of the present invention will be explained hereinafter.

In a equipment as shown in FIG. 1(A), the sensor assembly A on the fixed base B is varying, assuming that $\Delta g_{(A/L)i}$ is the acceleration of the edge of the sensor assembly A, and that Wi is the instant measuring load at the same time. Applying a law of motion, that is, $$\begin{aligned} W_i &= m(g + \Delta g_{(A/L)i}) \\ &= mg + m \cdot \Delta g_{(A/L)i} \\ &= W_e + m \cdot g \cdot (\Delta g_{(A/L)i}/g) \\ &= W_e(1 + \Delta g_{(A/L)i}/g) \end{aligned}$$

where We is the rest load (N) of a measuring object C, m is the mass (Kg).

The rest load We(N) of a measuring object C is obtained from the following equation, $$W_e = \frac{W_i}{(1 + \Delta g_{(A/L)i}/g)} = \frac{W_i \cdot g}{(g + \Delta g_{(A/L)i})} \quad (1)$$

where the acceleration $\Delta g_{(A/L)i}$ is calculated from a second-order derivative of the displacement of the edge of the sensor assembly A with respect to time.

The equation of motion as shown in equation (1) is derived by what is known as D'Alambert's dynamic equilibrium. The dynamic equilibrium doesn't take into consideration the materials and structural configurations of the elements.

In general, the undamped one-degree spring-mass system is subjected to an general-type forcing function F(t). The differential equation of motion is derived by using Newton's second law of motion, $$m\ddot{y} + ky = F(t)$$

In the spring-mass system as shown in FIG. 7, the initial condition is at time when the system is in its equilibrium position ye, that is the displacement derived by the rest load. The equation of motion is as follow, $$\begin{aligned} F(t) &= m \cdot \frac{d^2}{dt^2}(y - y_e) + k(y - y_e) \\ &= m\ddot{y} - m\ddot{y}_e + k(y - y_e) \end{aligned} \quad (2)$$

where yi is an instant displacement against an instant load excited by time-varying force. Thus the expression for F(t) ca be written as $$F(t) = W_i - W_e$$

Thus equation (2) yields $$m\ddot{y}_i - m\ddot{y}_e + k(y - y_e) = W_i - W_e \quad (3)$$

In equation (3), the displacement $y_e$ is constant, the acceleration $\ddot{y}_e = 0$. By utilizing the initial condition, an acceleration yi being expressed by $\Delta g(A/L)i$. The equation (3) is $$m\Delta g_{(A/L)i} + k(y_i - y_e) = W_i - W_e$$

This equation can be deformed as, $$W_e \frac{\Delta g_{(A/L)i}}{g} + k(y_i - y_e) = W_i - W_e \quad (4)$$

According to FIG. 8, $$y_i : y_e = W_i : W_e = (g + \Delta g_{(A/L)i}) : g$$

thus, $$\begin{aligned} y_i - y_e &= y_i - y_i \frac{g}{g + \Delta g_{(A/L)i}} \\ &= y_i \left( \frac{\Delta g_{(A/L)i}}{g + \Delta g_{(A/L)i}} \right) \end{aligned}$$

Therefore, by substituting this relation into equation (4), $$W_e \frac{\Delta g_{(A/L)i}}{g} + k(y_i - y_e) = W_i - W_e$$

By simplifying, $$W_e = \frac{W_i g}{g + \Delta g_{(A/L)i}} - \frac{k \cdot y_i \cdot g \cdot \Delta g_{(A/L)i}}{\{g + \Delta g_{(A/L)i}\}^2} \quad (5)$$

Getting a table of a relation between rest loads and displacements, it is easy to transform a displacement of measuring to an instant load Wi.

And also an instant load Wi is calculated from the Hook's law.

$$W_i = k \cdot y_i$$

As a result, the rest load We can be calculated from instant displacements, load and accelerations by using equation (5). The spring constant is determined by a shape, a configuration and material of structures composing to the sensor assembly. For example, assuming that the sensor assembly is a beam configuration, the spring constant is follows;

$$k = \frac{6EL}{l^3}$$

where E and I are the modules of elasticity and cross-sectional moment of inertia, (I=bh³/12), respectively, of the beam.

The dynamic load measurement method of the present invention comprises that the rest load We is calculated from measuring the acceleration $\Delta g_{(G/L)i}$ of the base, in the case that the base setting up the structure suspended by spring system is varying by vibrations and oscillations.

The principle of the load measurement in this case will be explained hereinafter.

Assuming that the base B or the sensor assembly A of a beam shape on the base B is subjected to a time-varying displacement, and the base B is vibrating with the acceleration $\Delta g_{(G/L)i}$, and the edge part of sensor assembly A is vibrating with the acceleration $\Delta g_{(A/L)i}$ against the base B, the equation (3) is as follows, $$m(\Delta g_{(A/L)i} - \Delta g_{(G/L)i}) + k(y_i - y_e) = m(g + \Delta g_{(A/L)i} - \Delta g_{(G/L)i})$$

In the case of the base B being varying, by substituting $\Delta g_{(A/L)i} - \Delta g_{(G/L)i}$ into $\Delta g_{(A/L)i}$ of equation (5), equation (5) can be expressed as $$W_e = \frac{Wig}{g + \Delta g_{(A/L)i} - \Delta g_{(G/L)i}} - \frac{k \cdot y_i \cdot g \cdot (\Delta g_{(A/L)i} - \Delta g_{(G/L)i})}{\{g + \Delta g_{(A/L)i} - \Delta g_{(G/L)i}\}^2}$$

As a result, the rest load We is calculated from computing the acceleration $\Delta g_{(G/L)i}$ from the displacement of the base and from computing the instant load Wi and the acceleration $\Delta g_{(G/L)i}$ from the displacement of the sensor assembly.

The dynamic load measurement method of the present invention comprises means to measure an acceleration $\Delta g_{(G/L)i}$ of a fixed edge of said frame body set up on a base excited by a time-varying vibration and oscillation, and the rest load We being calculated from the computing method.

The mean to measure a said acceleration $\Delta g_{(G/L)i}$ can comprises a set-up light-emitting element excited by a time-varying oscillation (including vibration) of said frame and a fixed-position one dimensional position detection element detecting a time-varying incident position of a light ray from a said light-emitting element.

Dynamic load measurement equipment comprises a frame body having a hollow interior portion, one edge of a beam being fixed to the fixed part of the frame body in a said hollow interior, a free edge part of the beam being opposed to a free edge of the frame body in a said hollow interior, setting up a said displacement sensor between a free edge of a said beam and a free edge of a said frame body.

The displacement sensor can be an optical displacement detection sensor and the detection element can be a one dimensional position detection element such as semiconductor position sensitive detectors (PSD) and pin photo diode elements (PPD). In the case of using these one dimensional position detection elements, it is possible to comprise setting up at a free edge of a said beam, a light-emitting element irradiating the one dimensional position detection element being set up to a fixed edge of the frame body.

BRIEF DESCRIPTION OF DRAWINGS

FIG. 6 shows a graph that a sensor equipment in FIG. 4 is acted on by a suddenly applied impulsive load, (A) shows a change of a dynamic load acted on a sensor assembly, (B) shows a change of an acceleration acted on a sensor assembly;

FIG. 7 shows a relation of a displacement and a load in a spring-mass system i order to explain a method of a dynamic load measurement adopting the present invention and a principle of a dynamic load measurement of the present dynamic load measurement equipment;

FIG. 8 shows a static load, a instant load and a graph of a relation of displacements of them;

FIG. 9 shows a cross-eyed illustration in order to show a spring stiffness of a sensor assembly beam.

FIG. 28 to FIGS. 34(A), 34(B) and 34(C) show a explanation draw of a dynamic load measurement equipment adopting the present invention, respectively.

DESCRIPTION OF THE PREFERRED EMBODIMENTS

Figure 10:
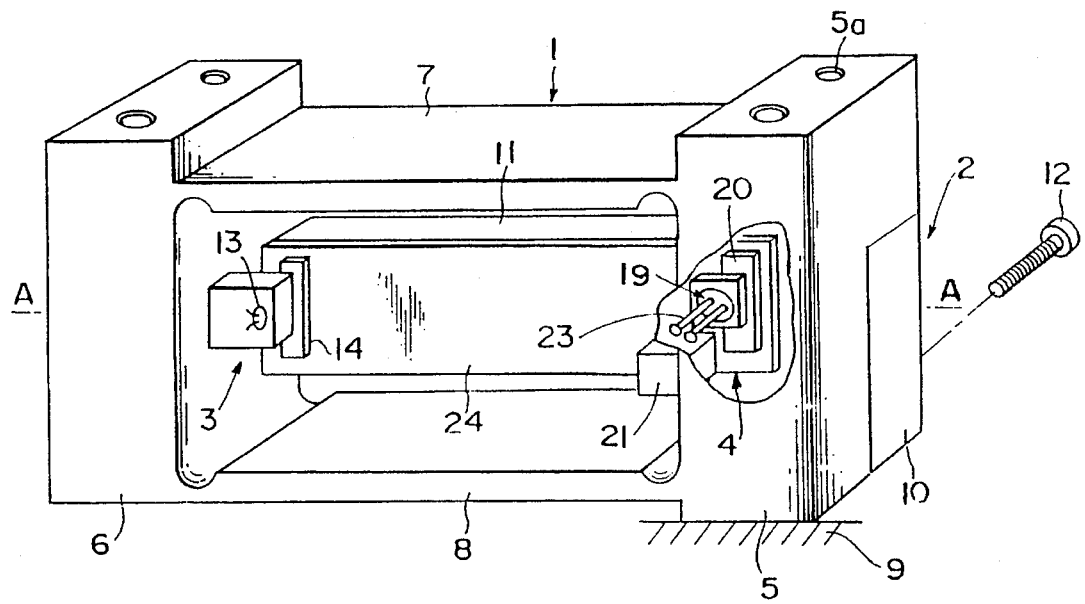
FIG. 10 shows a cross-eyed illustration of a preferred embodiment of a dynamic load measurement equipment adopting the present invention.
Figure 11:
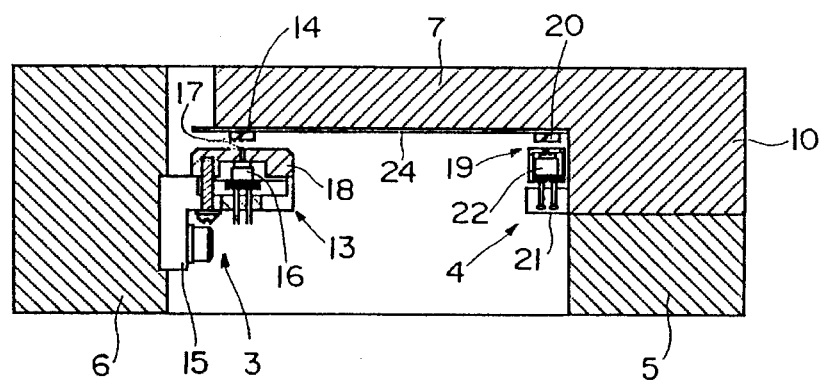
FIG. 11 shows a cross section of A—A as shown in FIG. 10.
Figure 12:
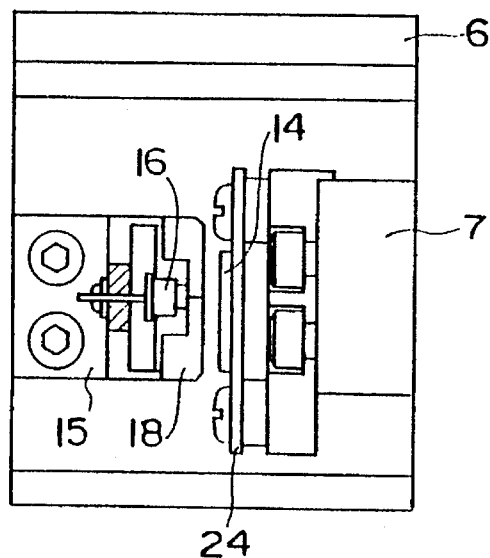
FIG. 12 shows an enlarged side view of a load detection sensor as shown in FIG. 10.
Figure 13:
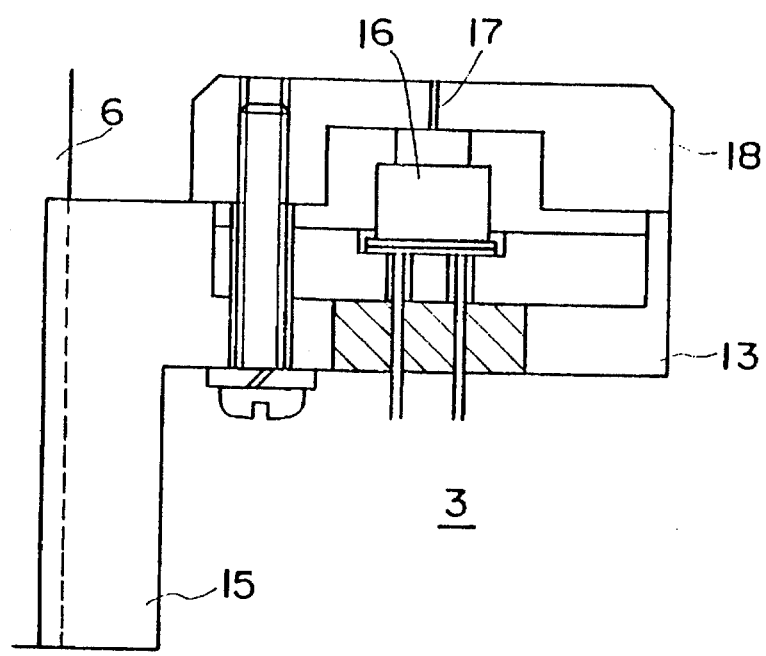
FIG. 13 shows an enlarged plane view of a load detection sensor as shown in FIG. 10.

The dynamic load sensor equipment of the present invention in FIG. 10 provides a frame body 1, an arm body 2, a load detection sensor 3 and an acceleration detection sensor 4.

The frame body 1 has also a rectangular hollow frame shape and provides a fixed column 5 with a large cross section, a movable column 6 that is opposed to a fixed column 5 and a upper and a lower frame girders 7 and 8 that are connected with the both columns 5 and 6. The fixed column 5 is set upon a base 9, the movable column 6 that is acted on by a measuring load is a free edge such as a cantilever beam. It is also possible that the fixed column 5 is set below a base 9, and the top upper plane side of the fixed column 5 has bolt holes 5a as shown in Figure.

The arm body 2 provides an arm-base 10 and an arm-beam 11, the arm-base 10 be attached to the fixed column 5 of the frame body 1 by bolts 12. The arm-beam 11 with the arm-base connected with the fixed column 5 is arranged in a hollow interior of the frame body 1 with a small gap between the movable column 6 and the arm-beam 10.

The load detection sensor 3 provides a light-emitter 13 set on the movable column 6 and a one dimensional position detection sensor such as a semiconductor position sensitivity detector (hereinafter this is called in short, PSD) 14 attached on an edge of arm-beam 11.

The light-emitter 13 has a light-emitting element 16 such as LED that is attached at the edge of a support stay 15 with L character of the movable column 6, and is covered with a cover 18 with a thin light-emitting hole 17. The PSD 14 is opposed to the thin light-emitting hole 17 and is attached in a longitudinal direction matched with the up-down direction of the illustration. The PSD 14 outputs a signal of showing a light-receiving position by the light- emitting element 16 from a thin light-emitting hole. If a position of the light-emitting element 16 is changed by a deflection of frame-beams 7 and 8 acted on by a load on the movable column 6, the change of position is output continuously by PSD 14. As the results, the output of the PSD 14 is data to show a displacement of the arm-beams 7 and 8 that is subject to the spring-mass system.

The acceleration detection sensor 4 provides a light-emitter 19 set on the fixed column 5 and a one dimensional position detection sensor such as a semiconductor position sensitivity detector (in short, PSD) 24 attached on a base of the arm-beam 11. The light-emitter 19 has a light-emitting element 22 such as LED that is attached at the base of a support block 21 and is covered with a cover with a thin light-emitting hole as same as the load detection sensor 3. The PSD 20 is opposed to the thin light-emitting hole and is attached in a longitudinal direction matched with the up-down direction of the illustration. The PSD 20 outputs a signal of showing a light-receiving position by the light-emitting clement 22 from a thin light-emitting hole. The light-emitting element 22 is connected with the support block 21 by multi-springs 23 and is vibrating in a vertical direction of the draw with the fixed column 5 attached on the base 9 with vibrations or oscillations excited by time-varying forces. If the vibration of the light-emitting element 22 is excited by the vibration of the base 9, the change of position is output continuously by PSD 20 and the output of the PSD 20 is data to show a time-varying displacement of the base 9.

Figure 14:
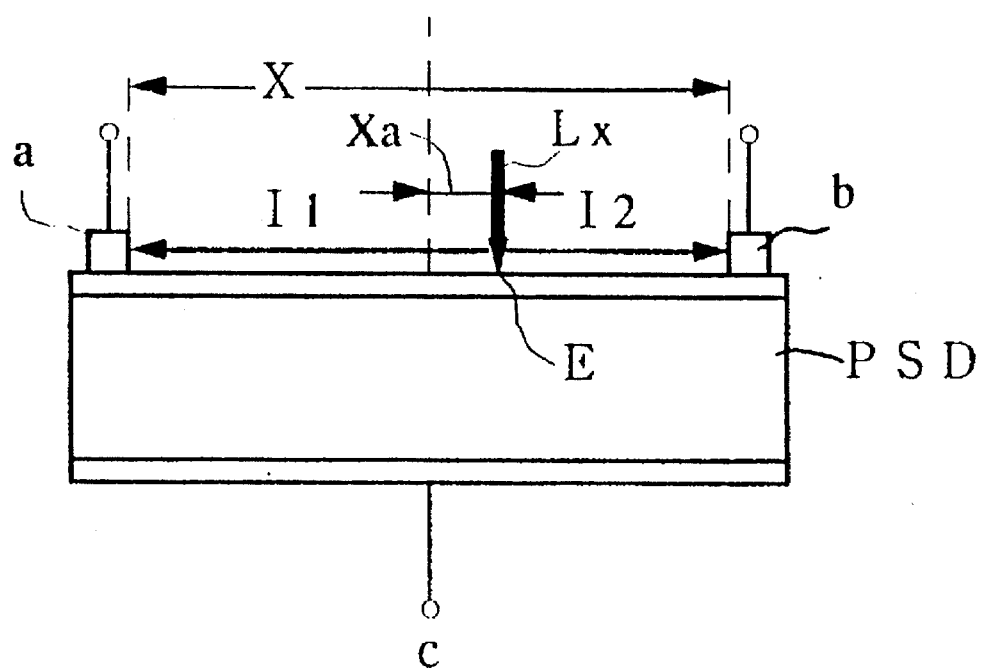
FIG. 14 shows a principle illustration of a positioning detection by a semi-conductor positioning device.
Figure 15:
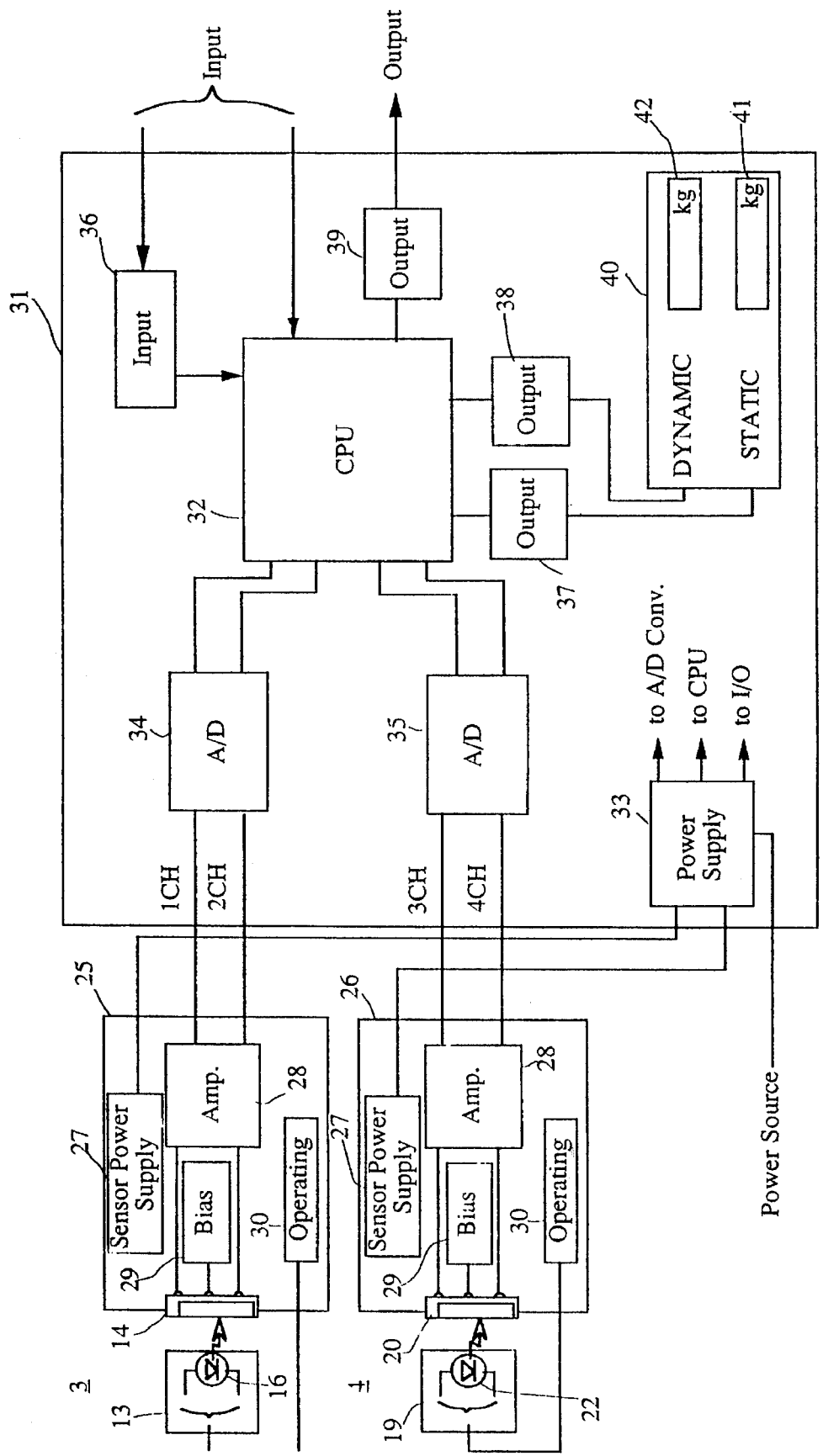
FIG. 15 shows a circuit composition layout of an equipment in FIG. 10.

FIG. 14 shows a principle draw of one dimensional position detection that is a PSD in FIG. 14. The light current I1 and I2 excited by the incident light ray Lx from a light emitting element are generated in inverse proportion with shooting distances between the incident position and electrodes a and b of the PSD, respectively. The incident position is obtained by a difference or a product of both output light currents. The distance Xa between the incident position E and the center position of electrodes a and b of a PSD is calculated from the following relation, $$(2Xa/X)=(I1-I2)/(I1+I2)$$

where X is a distance of electrodes a and b. From this relation, a incident position is independent on an intensity of an incident light ray.

Of course, the present invention is not restricted with a structure, a shape, and an assembly of a load detection sensor and an acceleration detection sensor as above mentioned. The present invention can adopt conventional load detection sensors and conventional acceleration detection sensors.

The two PSD units 14 and 20 as above mentioned are attached on a printed circuit board 24 of an arm-beam 11. The printed circuit board 24 provides, for example, two or more blocking-layers boards and provides two circuits of a PSD 14 and a light emitting element 16 in a load detection sensor 3 and a PSD 20 and a light emitting element 22 in art acceleration detection sensor 4, respectively; the load detection circuit 25 and the acceleration detection circuit 26.

These detection circuits 25 and 26 have the same circuit composition and provide sensor power supply circuits 27, current amplification circuits 28 that amplify position detection outputs by PSD units 14 and 20, bias circuits 29 for outputs of PSD units 14 and 20, and operating circuits 30 for light emitting elements, respectively. The detection circuits 25 and 26 are connected with each analyzing unit 31. The analyzing unit 31 provides a CPU 32, a power supply 33, two A/D converters 34 and 35, an input circuit 36, three output circuits 37, 38 and 39 and a display circuit 40.

The analyzing unit 31 can take many kinds of forms, for instance, attaching the analyzing unit to the fixed column 5 of the frame body 1 or to an arm-body 2, setting up a unit analyzer at outside of the frame body 1 or to an arm-body 2, attaching a part of a analyzing unit to the fixed column 5 of the frame body 1 and setting up a part of a unit analyzer at outside of sensing equipment.

The power supply circuit 33 is connected with an outside power supply and supplies to a sensor power supply circuit 27 of detection sensor circuits 25 and 26, a CPU unit 32, a A/D converter 34, an input circuit 36, three output circuits 37,38 and 39 and a display circuit 40. A couple of A/D converters 34 and 35 are connected with detection circuits 25 and 26 of the PSD units 14 and 20 via the current amplification circuits 28, and input a couple of analog data from a couple of A/D converters 34 and 35 of the current amplification circuit 28 to the CPU unit 32. An interface circuit of input signals is not shown in this case. The output circuit 37 is the display 41 of measurement loads of the display circuit 40, the output circuit 38 being the display 42 of a dynamic load of the display circuit 40, the output circuit 39 being the external output.

Figure 16:
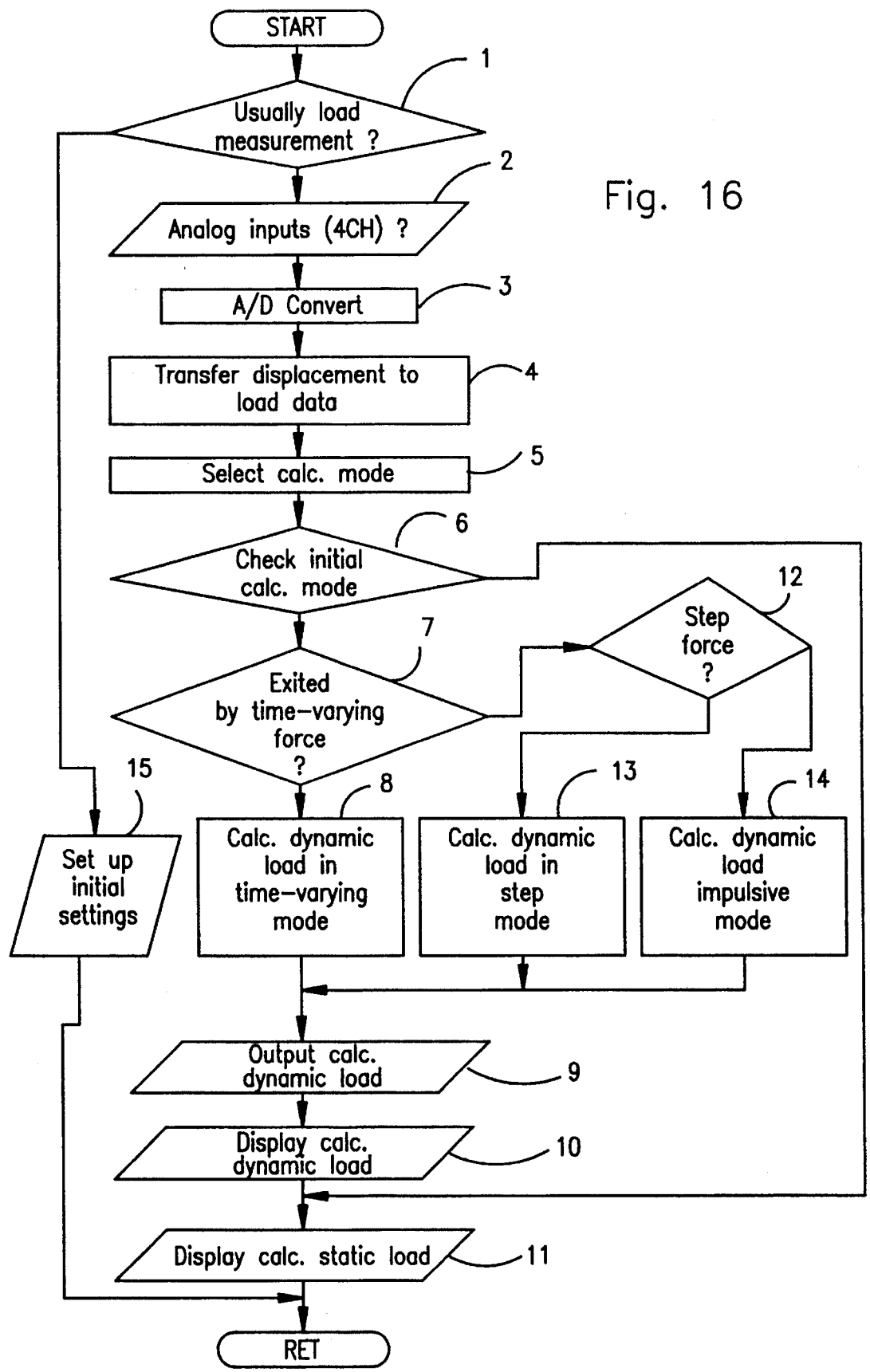
FIG. 16 shows a flowchart to show an action of an equipment in FIG. 10.

The operating flow of the present embodiment in FIG. 16 will now be described herein below.

After power is on, whether a determination is made as to a usual load measurement is required in step 1 at first. If the necessary measurement is not a load measurement, go ahead to step 15 and set up of initial settings. If it is a usual load measurement, go forward to step 2. In step 15, the selection of analyzing modes can be operated by an external input to an input circuit 36 (or CPU 32).

In case of a usual load measurement, at step 2 detection outputs of PSD units 14 and 20 are input to A/D converters 34 and 35, at step 3 be converted by A/D converters, at step 4 displacement data from the PSD unit 34 being transformed to load data. The displacement data is an instant displacement Ii, the load data being an instant load Wi. If getting a table by a relation between rest loads and displacements, it is easy to transform a displacement of a measuring output by a detection output of a PSD unit 14 to an instant load Wi. Considering the spring-mass system is subjected to the frame body 1 and frame beam 2, the spring constant k can be calculated from the Hook's law as, $$W_i = k \cdot y_i$$

After that, select a calculation mode at step 5. The selection of calculation modes can be operated by an external input to an input circuit 36 (or CPU 32), at step 6 the initial setting for calculation conditions being checked. Judge whether initial settings are right or not. If not starting the calculation, go ahead to step 11 and the measurement load transformed at step 4 is output from a output circuit 37 to an external output and is shown in the measurement load display 41 of the display circuit 40.

If starting the calculation, go forward to step 7 and judge whether the sensing equipment is excited by a time-varying force or not. If being exited by a time-varying force, at step 8 the dynamic load is calculated from the following equation in a time-varying mode, $$W_e = \frac{Wig}{g + \Delta g_{(A/L)i} - \Delta g_{(G/L)i}} - \frac{k \cdot y_i \cdot g \cdot (\Delta g_{(A/L)i} - \Delta g_{(G/L)i})}{\{g + \Delta g_{(A/L)i} - \Delta g_{(G/L)i}\}^2}$$

where We is a rest load to be requested load, $\Delta g(A/L)i$ being the acceleration of the movable column 6 of the frame body 1 and being second-order derivative with respect to time from a displacement Yi measured by the PSD unit 14, $\Delta g_{(G/L)i}$ being the acceleration of the base 9 to get second-order derivative with respect to time from a displacement Yi measured by the PSD unit 20.

If not starting the calculation, go forward to step 12 and judge whether the sensing equipment is excited by a suddenly applied constant and step force or not. If being exited by a suddenly applied constant and step force, at step 13 the dynamic load is calculated from the following equation in a step mode.

If not being exited by a suddenly applied constant and step force, at step 13 the dynamic load is calculated from the following equation in an impulsive mode.

$$W_e = \frac{Wig}{g + \Delta g_{(A/L)i}} - \frac{k \cdot y_i \cdot g \cdot \Delta g_{(A/L)i}}{\{g + \Delta g_{(A/L)i}\}^2}$$

Figure 1A:
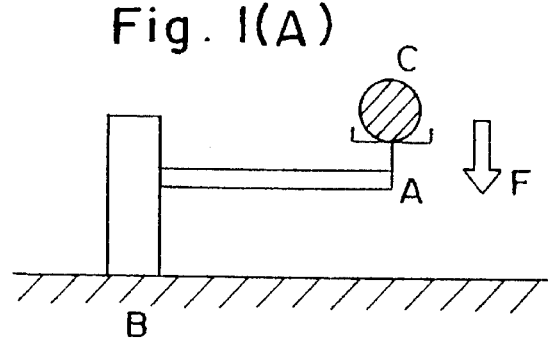
FIG. 1 shows a basic concept of a dynamic load measurement, (A) shows an equipment composition, (B) shows a time-varying load acted upon a sensor assembly, (C) shows a time varying acceleration acted upon a sensor assembly.
Figure 1B:
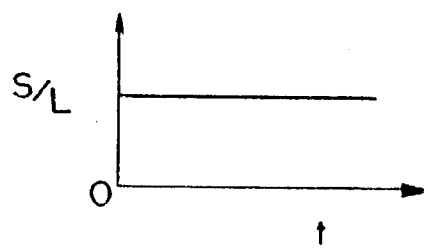
Figure 1C:
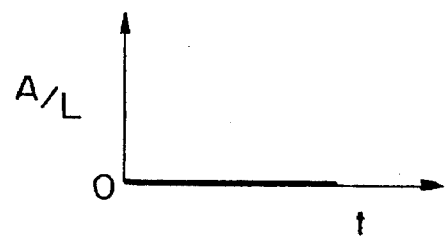
Figure 2A:
FIG. 2 shows the graph that a sensor equipment in FIG. 1 is acted on by a suddenly applied constant load, (A) shows a change of a dynamic load acted on a sensor assembly, (B) shows a change of an acceleration acted on a sensor assembly.
Figure 2B:
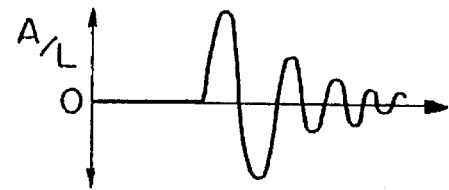
Figure 3A:
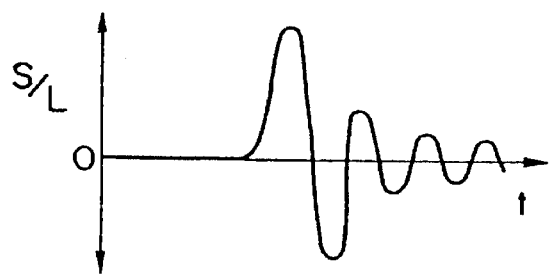
FIG. 3 shows a graph that a sensor equipment in FIG. 1 is acted on by a suddenly applied impulsive load, (A) shows a change of a dynamic load acted on a sensor assembly, (B) shows a change of an acceleration acted on a sensor assembly.
Figure 3B:
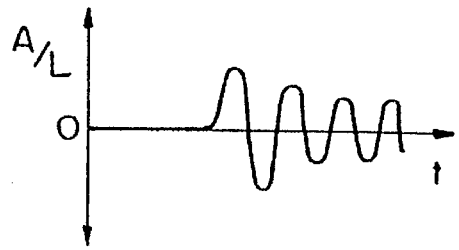
Figure 4A:
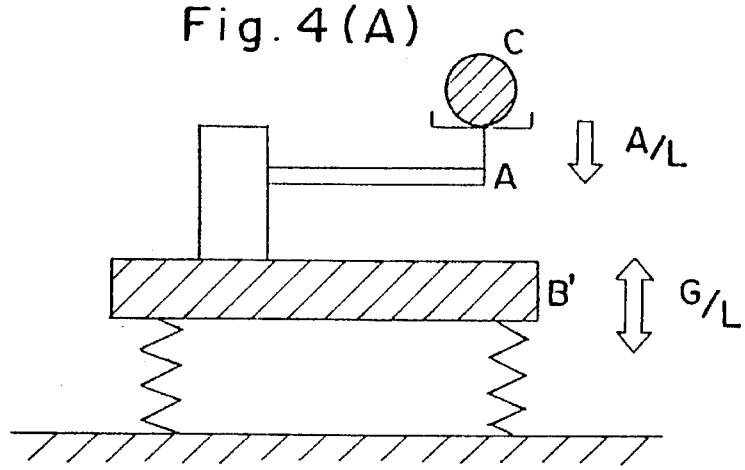
FIG. 4 shows a general layout illustration that a sensor equipment in FIG. 1 is set up on a time-varying oscillating and vibrating base, (A) an equipment composition, (B) shows a change of a dynamic load acted on a sensor assembly, (C) shows a change of an acceleration acted on a sensor assembly.
Figure 4B:
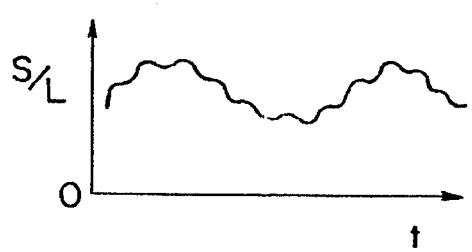
Figure 4C:
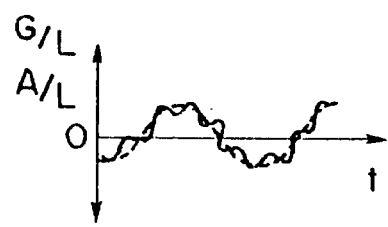
Figure 5A:
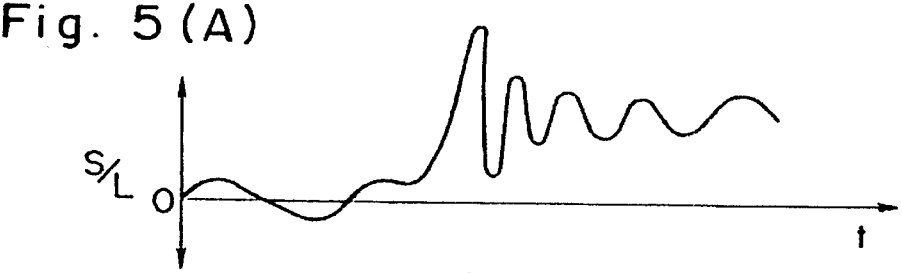
FIG. 5 shows a graph that a sensor equipment in FIG. 4 is acted on by a suddenly applied constant load, (A) shows a change of a dynamic load acted on a sensor assembly, (B) shows a change of an acceleration acted on a sensor assembly.
Figure 5B:
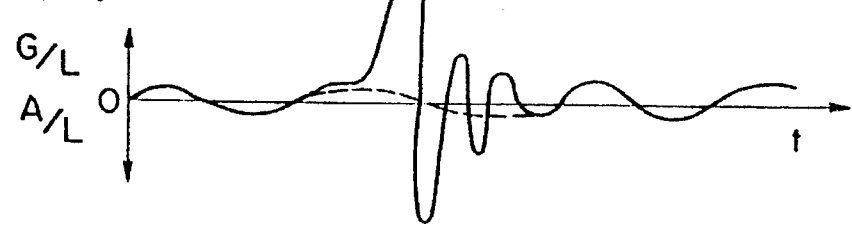

In the step and the impulsive mode, since the time-dependent load curve in the step mode is different from that in the impulsive as shown in FIGS. 2 and 3, it is different from the calculation setting conditions such as a sampling period, sampling range and so on.

The calculated result at step 8, 13 and 14 is output from output circuits 38 and 39 to an external output at step 9 and is shown in the dynamic load display 42 of the display circuit 40 (step 10).

A calculated results of the present embodiment will be explained hereinbelow.

Figure 17:
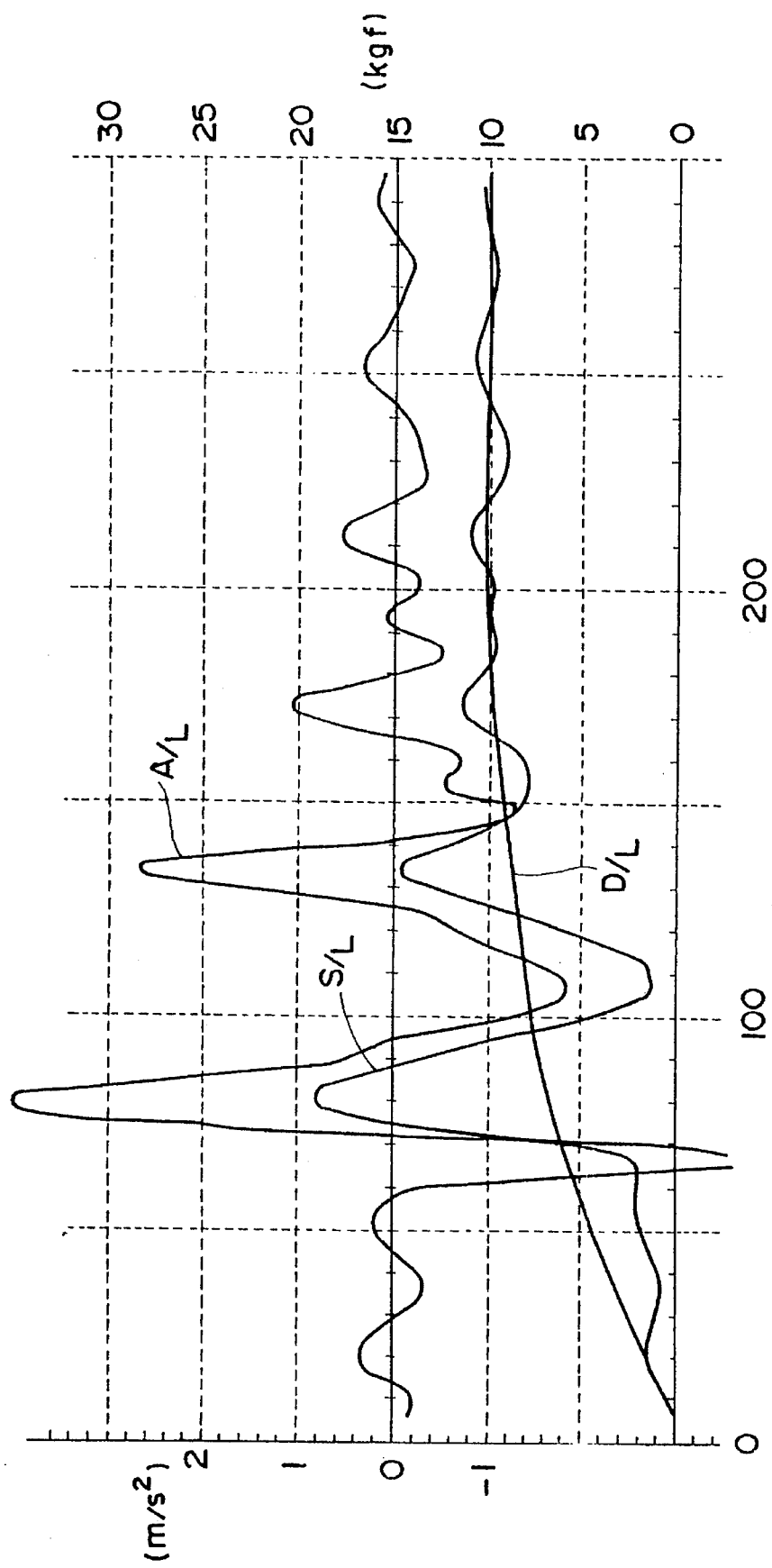
FIG. 17 shows an acceleration and a measurement load acted on by a suddenly applied constant force at a still base as shown in FIG. 10.

FIG. 17 shows the measurement results acted on by a suddenly applied constant and step force at a still base 9 as dropping a weight on 10 Kgf to the movable column 6. In FIG. 17, D/L is a dynamic load, G/L being an acceleration and S/L being a measurement load. It is found that a dynamic load is in agreement with the rest load on 10 Kgf at time of 200 milliseconds.

Figure 18:
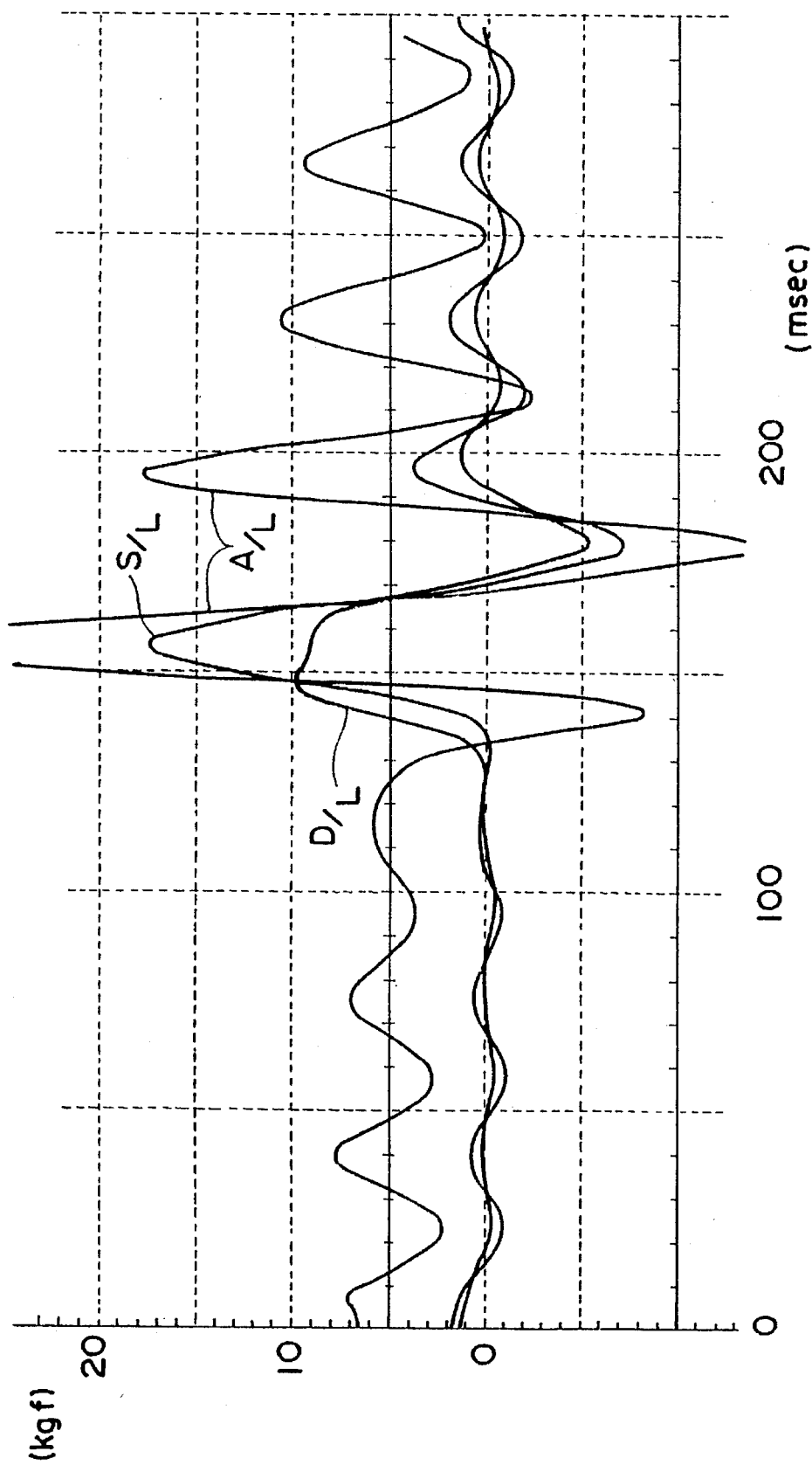
FIG. 18 shows an acceleration and a measurement load acted on by a suddenly applied impulsive force at a still base as shown in FIG. 10.

FIG. 18 shows the measurement results acted on by a suddenly applied impulsive force at a still base 9 as dropping a weight on 10 Kgf to the movable column 6 and as removing at once. In FIG. 18, D/L is a dynamic load, G/L being an acceleration and S/L being a measurement load. It is found that a dynamic load is in agreement with the rest load on 10 Kgf at time of 150 milliseconds.

Figure 19:
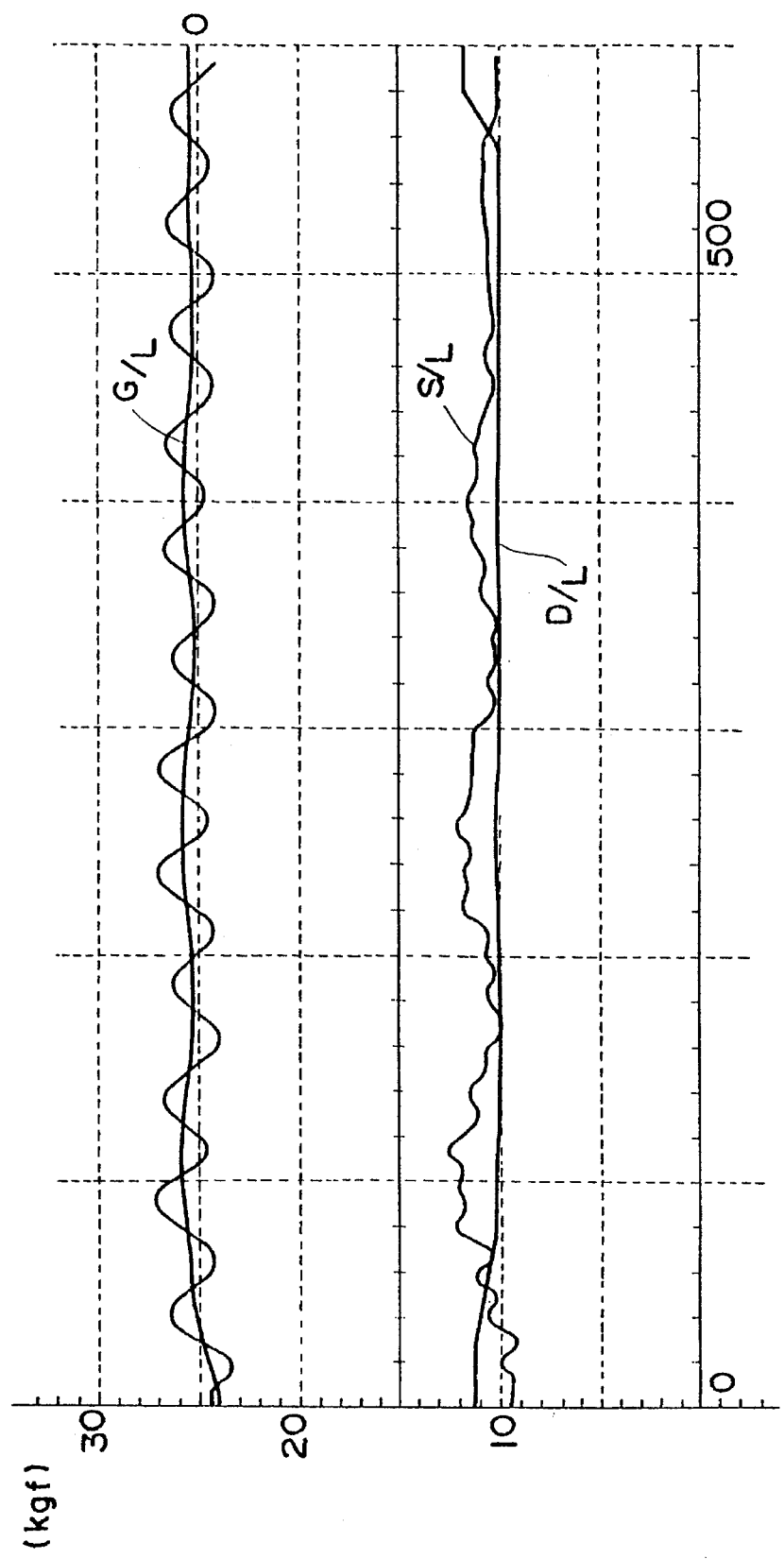
FIG. 19 shows an acceleration and a measurement load acted on by a time-constant force at a time-varying base as shown in FIG. 10.

FIG. 19 shows the measurement results acted on by a lime constant force at a time-varying base 9 as putting softly on a weight on 10 Kgf to the movable column 6. In FIG. 19, it is found that a dynamic load is in agreement with the rest load on 10 Kgf under the condition of the base 9 vibrating.

Figure 27:
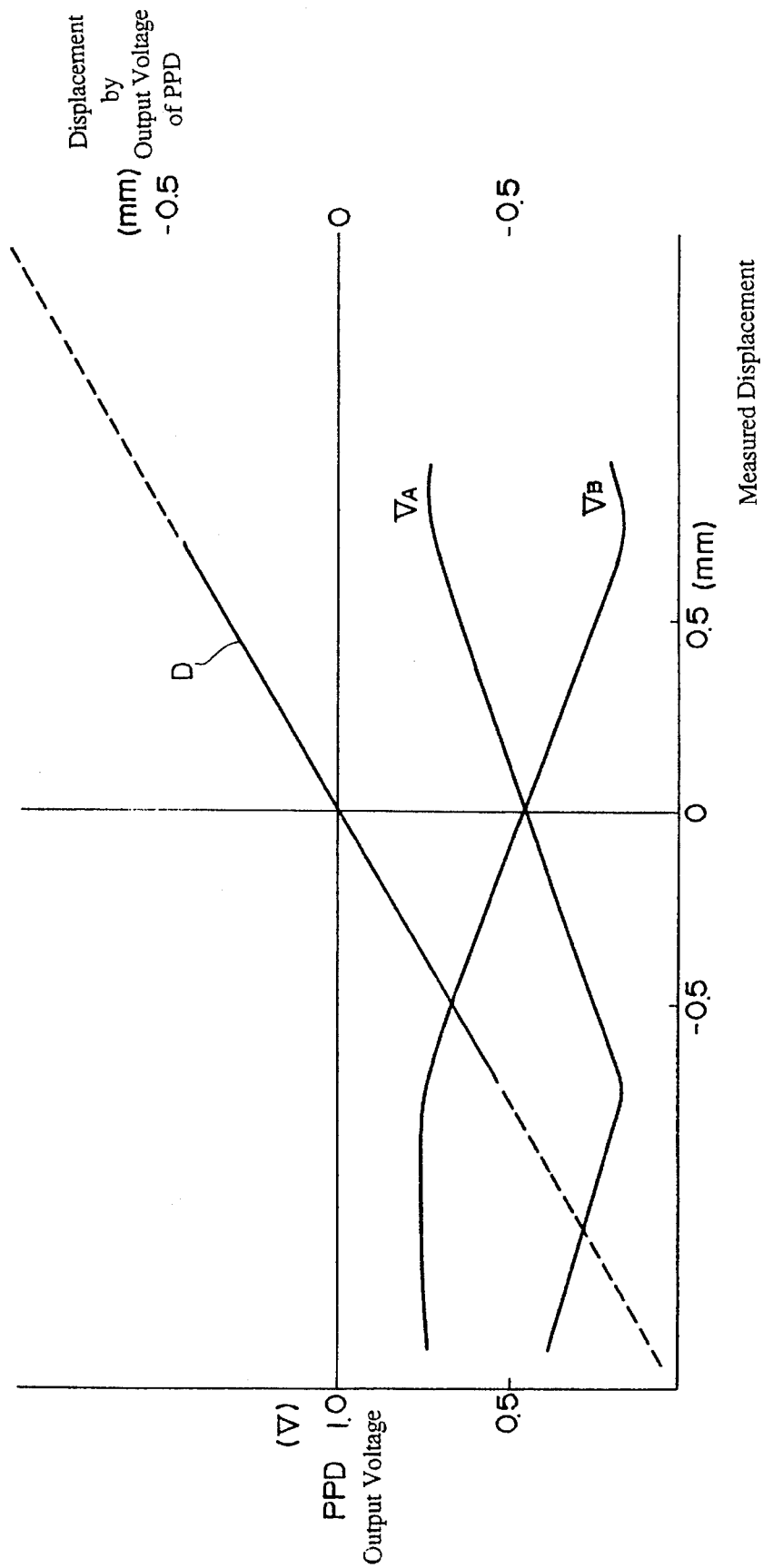
FIG. 27 shows a graph of a measurement result of an experimental preferred embodiment in FIG. 26.

The second preferred embodiment of the present invention in FIGS. 20 and 27 will be described hereinbelow.

Figure 20:
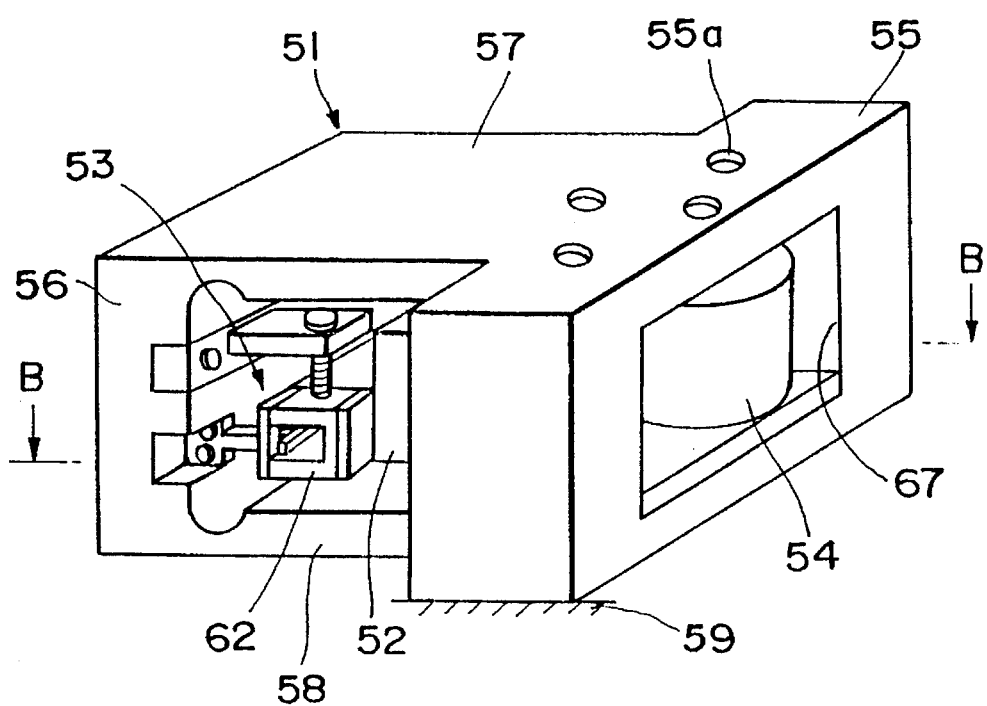
FIG. 20 shows a perspective illustration of an another preferred embodiment of a dynamic load measurement equipment adopting the present invention.

The dynamic load sensor equipment of the present invention in FIG. 20 provides a frame body 51, an arm body 52, a load detection sensor 53 and an acceleration detection sensor 54.

The frame body 51 has also a rectangular hollow frame shape and provides a fixed column 55 with a large cross section, a movable column 56 that is opposed to a fixed column 55 and a upper and a lower frame girders 57 and 58 that are connected with the both columns 55 and 56. The fixed column 55 is set upon a base 59, the movable column 56 that is acted on by a measuring load is a free edge such as a cantilever beam. It is also possible that the fixed column 55 is set below a base 59, and the top upper plane side of the fixed column 55 has bolt-holes 55a as shown in Figure.

The arm body 52 is arranged in a hollow interior 60 of the frame body 51 and toward the movable column 56 in that a housing 63 of a load detection sensor 53 is set up.

The load detection sensor 53 provides a light emitting element 63 and a one dimensional position detection sensor such as a semiconductor pin-photo diode (in short, PPD) 64 set up the housing 62. A bar-mask 66 is inserted into a portion between the light emitting element 63 and the PPD unit 64 from the edge of the stay 65 fixed to the movable column 56. If the PPD unit 64 receives a incident ray from the light emitting element 63, the PPD unit generates the light current in proportion with the light receiving area and the intensity of the light ray. If a position of the bar-mask 66 is changed by a deflection of frame-beams 57 and 58 acted on by a load on the movable column 56, the change of position is output continuously by PPD 64.

Figure 24:
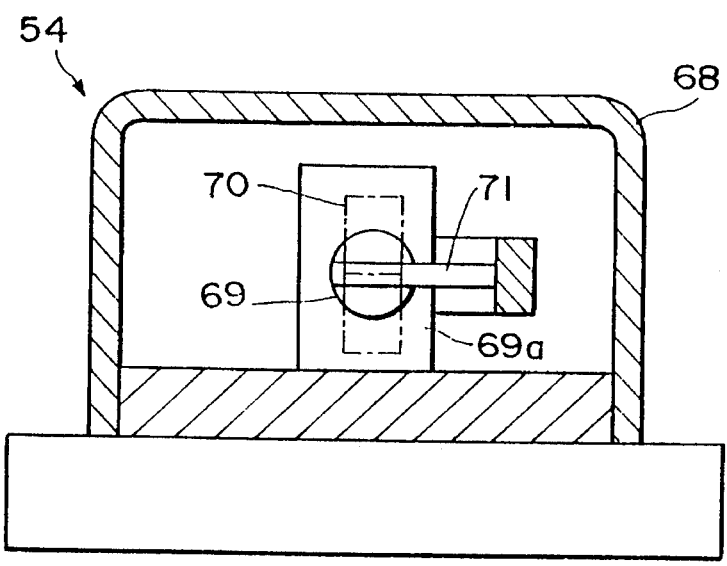
FIG. 24 shows a C—C cross section as shown in FIG. 20.

The acceleration detection sensor 54 provides a light emitting element 69 and a one dimensional position detection sensor such as a semiconductor pin-photo diode 70 set up in the inner hollow portion 67. In the cover 68, the light emitting element 69 is opposed to the one dimensional PPD unit 70. A thin movable bar-mask 71 attached to the supporter block 69a is inserted into a portion between the light emitting element 69 and the PPD unit 70. If the PPD unit 70 receives a incident ray from the light emitting element 69, the PPD unit generates the light current in proportion with the light receiving area and the intensity of the light ray. The thin movable bar 71 is to vibrate in the vertical direction of in FIG. 24, with the frame body 51 and the base 59. If the light receiving area of the PPD unit 70 is changed by the vibration of the thin bar 71, the light current against the change of light receiving area is output continuously by PPD 70.

The principle of a position detection using by the PPD in FIG. 25 will be explained hereinbelow.

Figure 25A:
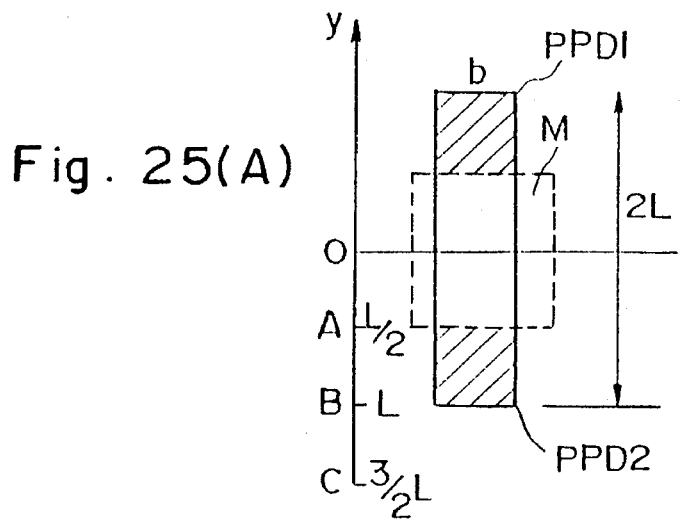
FIGS. 25(A) and (B) show a principle of a positioning detection by a pin-photo diode.
Figure 25B:
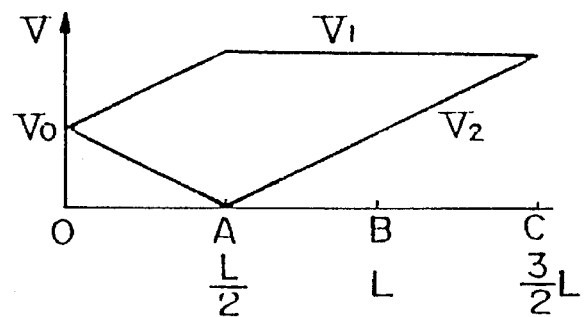

FIGS. 25(A) and (A) show a position relation with a mask M and PPD and FIG. 25(C) shows a position relation of a mask M and output voltage of PPD. In well-known, the PPD unit is an element that the output voltage is in proportion with the light receiving area and the intensity of the light ray. It is clear that the PPD unit only is not operated as a position detection element. The inventors of the present invention can let be operated a PPD unit as a position detection element by adding a mask M to a PPD unit that is made up of a pair of elements PPD1 and PPD2 that is arranged with a thin gap.

Assuming that the output voltages of elements PPD1 and PPD2 is V1 and V2, respectively, displacement from the center of the PPD unit 0 to the center of the mask M is 1, a position of the mask M is calculated from the following relations, When the center of a mask M is between O–A, such as $0 \leq 1 \leq L/2$ where 1 is a displacement, $$1 = \frac{V1 - V2}{V1 + V2} \cdot \frac{L}{2}$$

When the center of a mask M is between A–C, such as $L/2 \leq 1 \leq 3L/2$, $$1 = \frac{V2}{V1} \cdot L + \frac{L}{2}$$

If an intensity I of a light ray is constant, the output voltage V1 and V2 of elements PPD1 and PPD2 are only dependent on the position of the mask M. It is able to use PPD units as a position detection sensor because of calculating the center position of the mask M from the above related position detection element from an aforementioned relation.

A case that the intensity of the light lay changes will be considered hereinbelow. The variation dV of the output voltages of elements PPD1 and PPD2 is in proportion with the dI of the intensity of the incident light under the condition that the intensity of the incident light are changing. If the characteristics of elements PPD1 and PPD 1 is the same, the variation dV of output voltage between PPD1 and PPD2 is the same trader the same conditions. If the variation of the intensity of light is only dependent on the variation $dV_{LED}$ of the light emitting power $V_{LED}$ of the light emitting element, the variation is in proportion with the variation of light power.

When the center of a mask M is between positions, O–A, the displacement 1 is calculated from the following equations, $$1 = \frac{\left(V1 + V1 \frac{dI}{dt}\right) - \left(V2 + V2 \frac{dI}{dt}\right)}{\left(V1 + V1 \frac{dI}{dt}\right) + \left(V2 + V2 \frac{dI}{dt}\right)} \cdot \frac{L}{2}$$

$$= \frac{(V1 - V2) - \left(1 + \frac{dI}{dt}\right)}{(V1 + V2) + \left(1 + \frac{dI}{dt}\right)} \cdot \frac{L}{2}$$

$$= \frac{(V1 - V2)}{(V1 + V2)} \cdot \frac{L}{2}$$

When the center of a mask M is between positions, A–C, the displacement 1 is calculated from the following equations, $$1 = \frac{\left(V2 + V2 \frac{dI}{dt}\right)}{\left(V1 + V1 \frac{dI}{dt}\right)} \cdot L + \frac{L}{2}$$

$$= \frac{V2}{V1} \cdot L + \frac{L}{2}$$

From above analysis the influence of the change of light power can be removed and, as the results, PPD units can be useful as a position detection sensor. If PPD units can detect position, an acceleration is calculated from a second-order derivative with respect to time and PPD units can be useful as an acceleration detection sensor.

Figure 26:
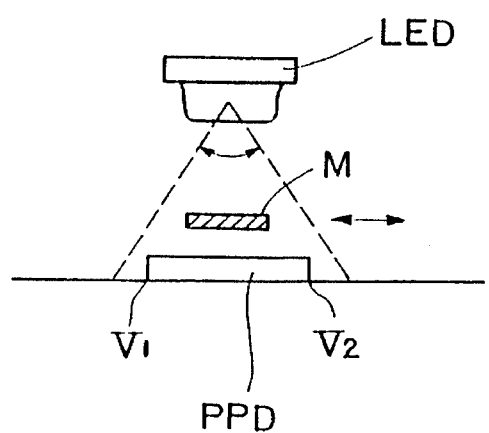
FIG. 26 shows an experimental preferred embodiment of a positioning detection by a pin-photo diode.

The experimental embodiment in FIG. 16 will now be described. The microdisplacement is attached to the mask M that is inserted into between LED and PPD and let be move by any device such as a micrometer. The output voltages V1 and V2 of elements PPD are measured by turns. It is shown in FIG. 27 for the measurement results. The displacement D by output voltage of PPD becomes a linear curve as shown in Figure. It is found that PPD can be useful as a position detection sensor. The width of the mask M in FIG. 26 is 1.5 mm and the one of PPD is 3.0 min.

Figure 21:
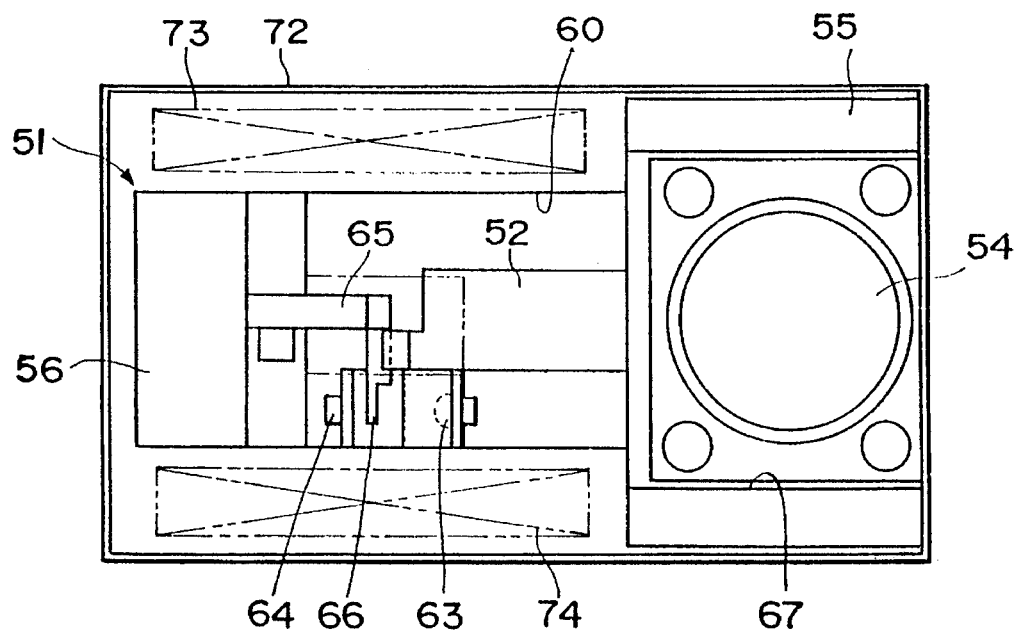
FIG. 21 shows a B—B cross section of the dynamic load measurement equipment as shown in FIG. 20.
Figure 22:
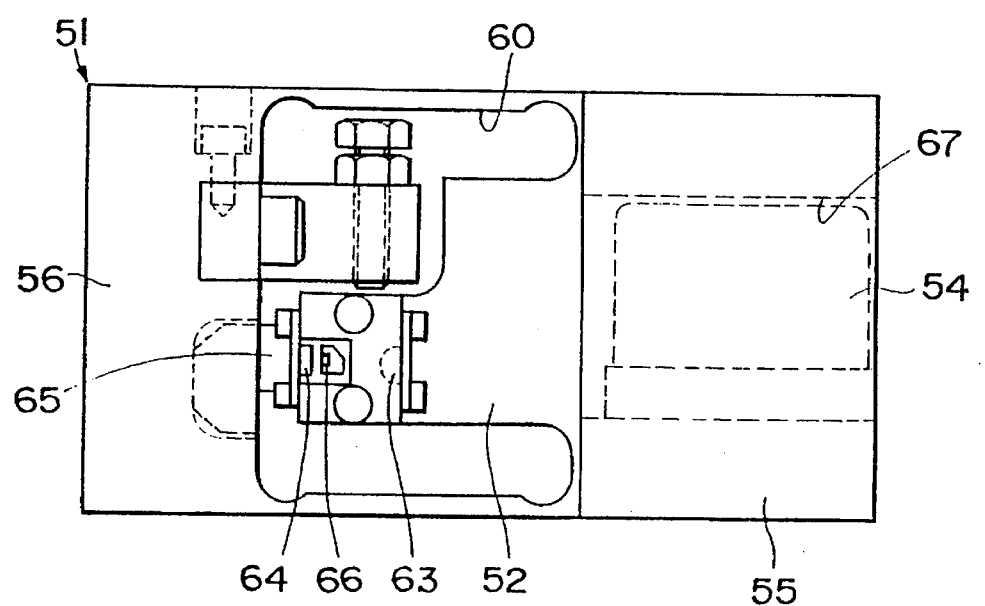
FIG. 22 shows an enlarged side view of the dynamic load measurement equipment as shown in FIG. 20.
Figure 23:
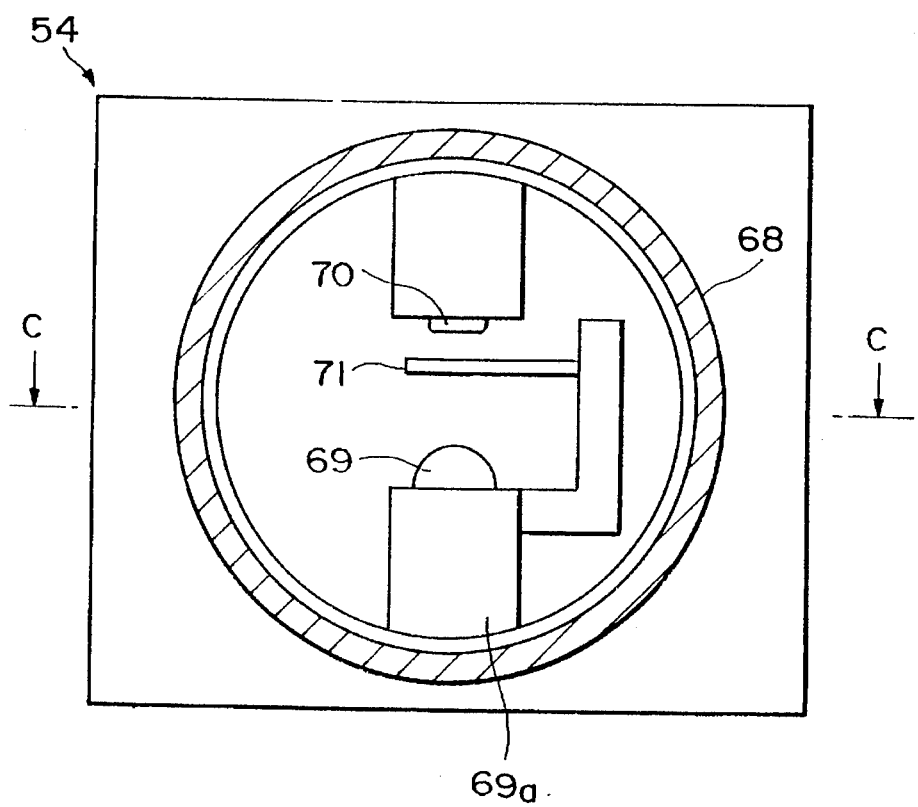
FIG. 23 shows an enlarged plane view of an acceleration detector equipment as shown in FIG. 20.

The cover 72 in FIG. 21 is omitted in FIG. 20. The printed circuit boards 73 and 74 that are the same as the preferred embodiment are set up in the cover 72. The explanation of the operating flow is omitted because of the same as the preferred embodiment.

An example of the load measurement equipment to use the dynamic load measurement equipment by the present invention in FIGS. 28 and 34 will now be described. The following preferred embodiment is a general idea or conception of using conditions as using by the dynamic load measurement equipment of the present invention and is not an assembly of real measurement equipment.

Figure 28:
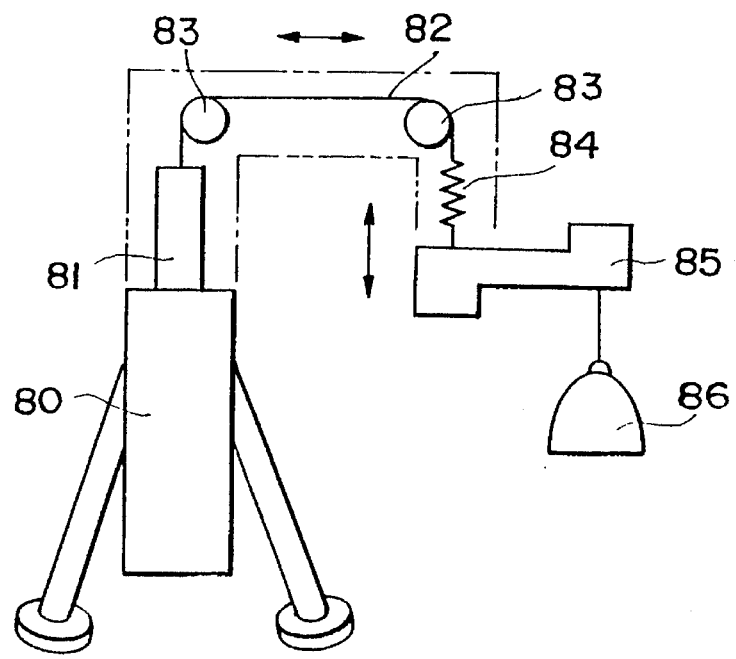

In FIG. 28, the dynamic load sensor 85 (in short, DLS) of the present invention is attached to the spring 84 at the edge of the wire 82 that passes through a pair of rollers 82 and 83 and that is connected to the edge of the rod of the oil cylinder 81 on the base block 80. As not shown in figure in-detail, the spring 84 at the edge of the wire 82 is fixed at the upper plane of the fixed column of the frame body of DLS 85' and the measurement object 86 is attached to the lower plane of the movable column of the frame body. This equipment is an example of hanging DLS with measurement objects using by springs system.

Figure 29:
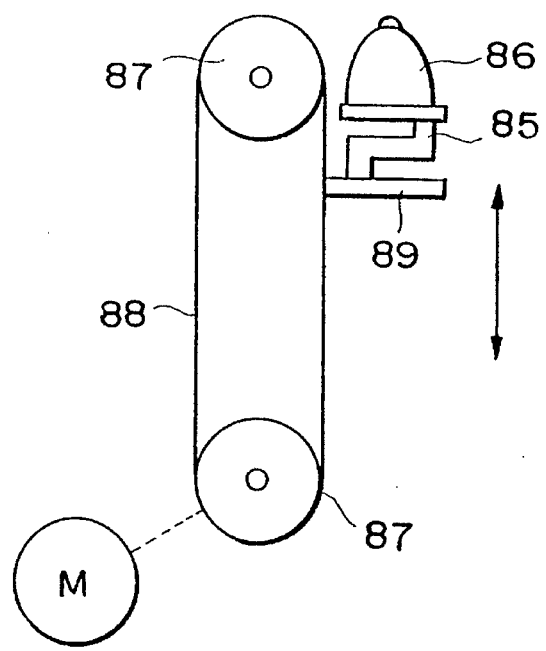

In FIG. 29, the DLS 85 of the present invention is set up on the support base 80 that is moved in the vertical direction by the wire 88 that passes through a pair of rollers 87 and 87. This equipment is an example of a system of moving in the vertical direction such as sailing vessels and airplanes.

Figure 30:
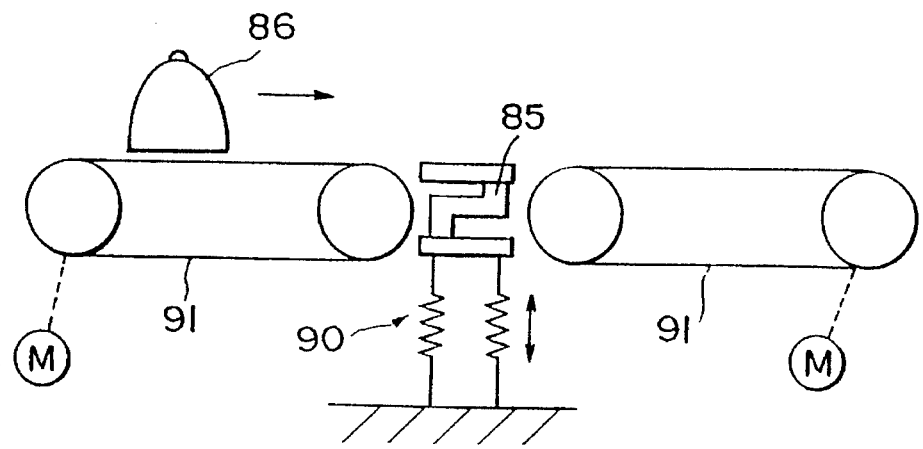
Figure 31:
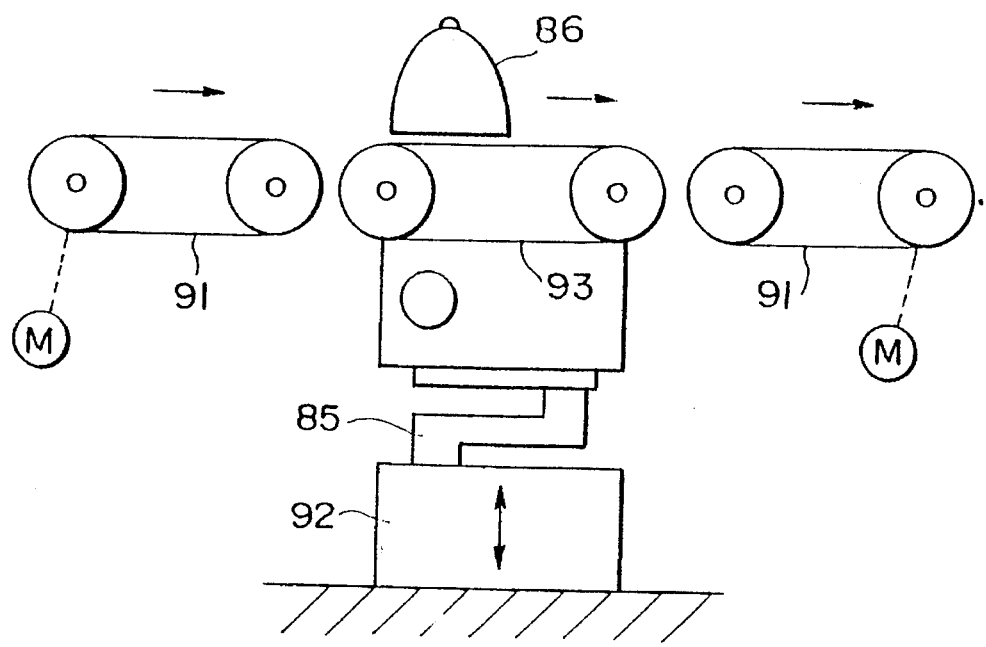

In FIG. 30, the DLS 85 of the present invention is set up on the base 92 suspended by springs system and is arranged between a pair of belt conveyers 91 and 91. It is possible to measure the load, the measurement object 86 passing on the DLS 85. FIG. 31 shows that the DLS 85 of the present invention is set up on the time-varying base 92 and is arranged between a pair of belt conveyers 91 and 91. This equipment as shown in FIGS. 30 and 31 is an example of a system of using the DLS with carrying devices such as belt conveyers. It is not necessarily to use the DLS of the present invention together with a pair of belts conveyers. It is considered that it is enough power to convey the object 86 by the belt conveyer on the DLS 85.

Figure 32:
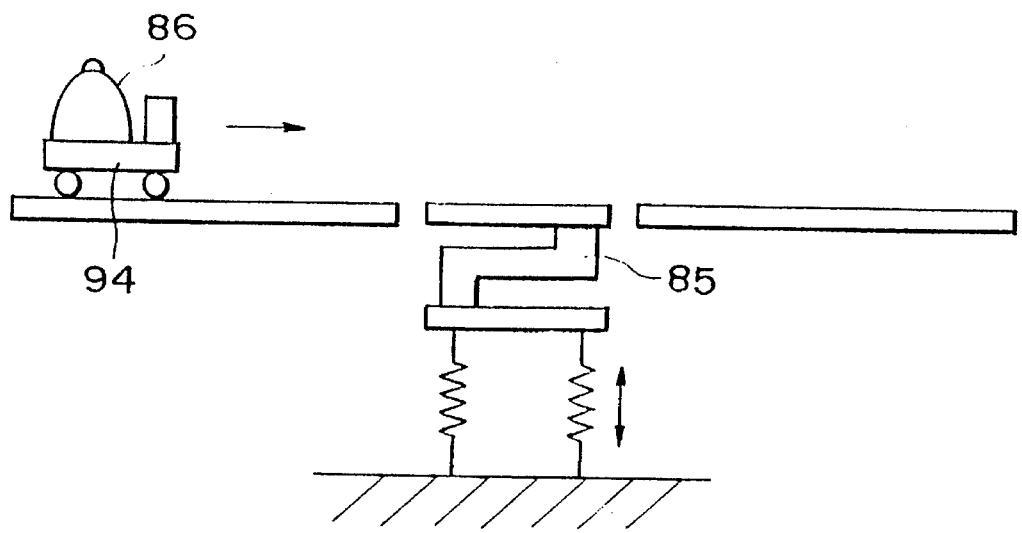
Figure 33:
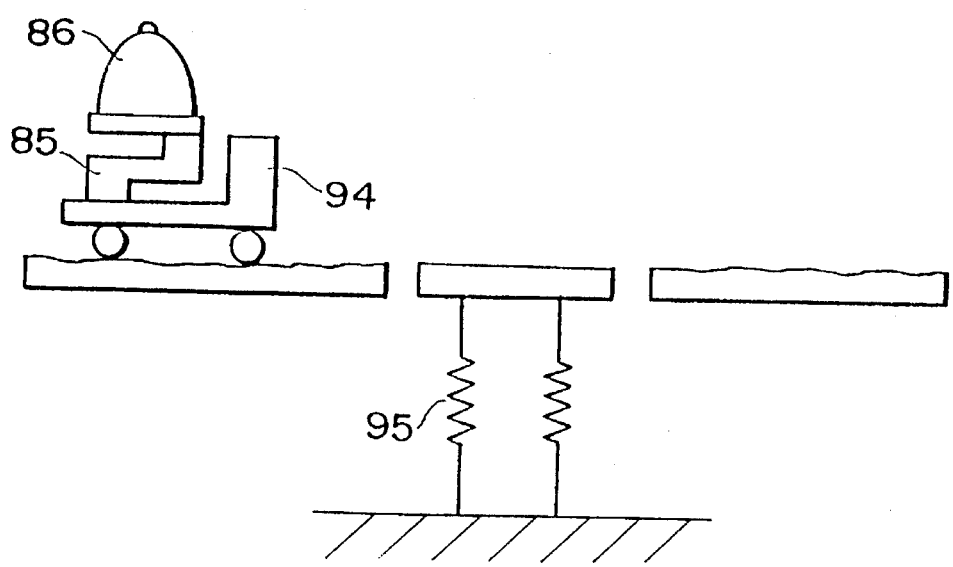

In FIG. 32 the DLS 85 being laid tinder the ground to a road or a passageway, it is composed to measure a load when a vehicle 94 pass on it. If a weight of a vehicle 94 become clear before, a load of a object 86 on the vehicle 94 can be measured by the DLS 85 of the present invention. The equipment in FIG. 32 is composed to measure a load when a vehicle 94 on that the DLS 85 is set up is running on a rough road whose surface is convex and concave. In this case, it is possible to have a part suspended by springs system on the way. It is possible to be composed by both an equipment in FIG. 32 and an one in FIG. 33.

Figure 34A:
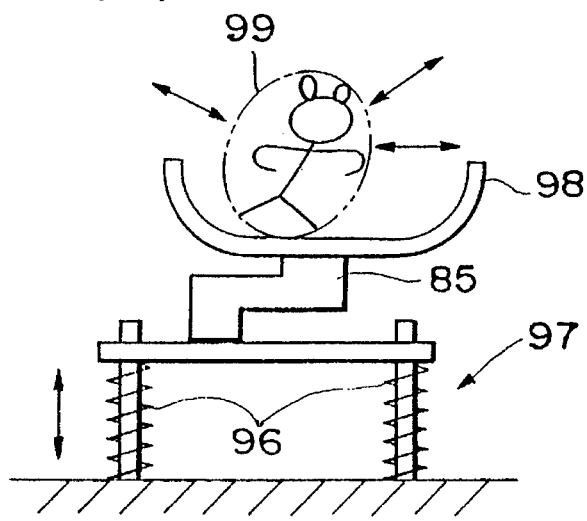
Figure 34B:
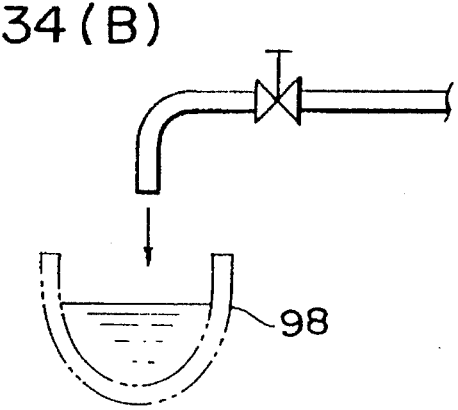
Figure 34C:
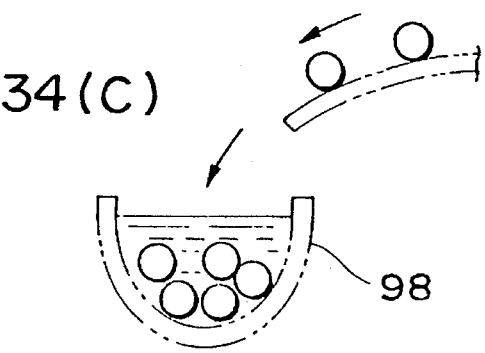

The equipment in FIG. 34 is composed to measure a load of the object 99 in the receptacle 98 that is set up on the DLS 85 that is fixed on the time-varying base excited by springs system. FIG. 34(A) shows that it is composed to apply to measure a load for moving objects such as men and animals. FIG. 34(A) shows that it is possible to apply to measure a load for flowing fluid such as water. FIG. 34(A) shows that it is possible to apply to measure a load for a case of throwing down objects such as fishes.

INDUSTRIAL APPLICABILITY

As above mentioned, the dynamic load measurement method and the dynamic load measurement equipment of the present invention can make good use of the load measurement for a dynamic state excited by a shaking and a vibrating conditions, such that it is available to measure an instant load in case that a load is varying during measuring by fluid flowing, and to measure a load for moving objects such as living fishes, and for a time varying place or base such as sailing vessels, flying airplanes, conveyers and so on, and for running vehicles and so on.

We claim:

1. Dynamic load measurement equipment comprising:

a frame body;

a structural member constituting a spring-mass system, said structural member having a first edge fixed to said frame body and a free edge;

a displacement sensor arranged to measure a displacement $Y_i$ of said free edge due to a rest load $W_e$;

means for computing an instant load $W_i$ from said displacement $Y_i$;

means for computing an acceleration $\Delta g_{(A/L)i}$ as a second-order derivative of said displacement $Y_i$ with respect to time; and means for determining the rest load $W_e$ according to the relationship $$W_e = \frac{W_i g}{g + \Delta g_{(A/L)i}} - \frac{k \cdot y_i \cdot g \cdot \Delta g_{(A/L)i}}{\{g + \Delta g_{(A/L)i}\}^2}$$

where g is the acceleration due to gravity and k is a spring constant.

2. Dynamic load measurement equipment according to claim 1, wherein an instant load $W_i$ is obtained from the following relation, $$W_i = k \cdot y_i.$$

3. Dynamic load measurement equipment according to claim 2, wherein said frame body has a hollow interior portion and said structural member comprises a beam, and wherein one edge of said beam is fixed to a fixed part of said frame body in said hollow interior and a free edge part of said beam is opposed to a free edge of said frame body in said hollow interior, said displacement sensor being arranged between said free edge part of said beam and said free edge of said frame body.

4. Dynamic load measurement equipment according to claim 3, wherein said displacement sensor comprises an optical displacement detection sensor.

5. Dynamic load measurement equipment according to claim 4, wherein said displacement sensor comprises a one dimensional position detection element.

6. Dynamic load measurement equipment according to claim 5, wherein said one dimensional position detection element is arranged at said free edge of said beam, said equipment further comprising a light-emitting element arranged on said fixed edge of said frame body to irradiate said one dimensional position detection element.

7. Dynamic load measurement equipment according to claim 5, wherein said one dimensional position detection element comprises a semiconductor position sensitive detector.

8. Dynamic load measurement equipment according to claim 5, wherein both said one dimensional position detection element and a light-emitting element directed toward said one dimensional detection element are fixed opposite one another near said free edge of said beam, said equipment further comprising a bar arranged at said free edge of said frame body and inserted into an optical path between said one dimensional position detection element and said light-emitting element, a part of said one dimensional position detection element being masked by said bar.

9. Dynamic load measurement equipment according to claim 8, wherein said one dimensional position detection element comprises a pair of photodiodes each of which generates an output in proportion to an amount of light receiving area illuminated by said light-emitting element.

10. Dynamic load measurement equipment according to claim 3, further comprising means for suspending said fixed part of said frame body.

11. Load measurement equipment according to claim 3 further comprising a base moving in a vertical direction.

12. Load measurement equipment according to claim 3 further comprising conveying means arranged to convey said load to a position where said load is measured by said dynamic load measurement equipment, said position being adjacent said conveying means.

13. Load measurement equipment according to claim 3 further comprising conveying means arranged to convey said load to a position where said load is measured by said dynamic load measurement equipment, said position being beneath said conveying means.

14. Load measurement equipment according to claim 3, wherein said dynamic load measurement equipment is positioned under a path of an object to be measured.

15. Load measurement equipment according to claim 3 wherein said dynamic load measurement equipment is positioned on a moving object.

16. Load measurement equipment according to claim 15 wherein said moving object is a vehicle.

17. Load measurement equipment according to claim 3 further comprising a receptacle for holding said load.

18. Dynamic load measurement equipment comprising:

a frame body;

a structural member constituting a spring-mass system, said structural member having a first edge fixed to said frame body and a free edge;

a displacement sensor arranged to measure a displacement $Y_i$ of said free edge due to a rest load $W_e$;

means for computing an instant load $W_i$ from said displacement $Y_i$;

means for computing an acceleration $\Delta g_{(A/L)i}$ as a second-order derivative of said displacement $Y_i$ with respect to time;

means for measuring an acceleration $\Delta g_{(A/L)i}$ of said fixed edge of said frame body set up on a base excited by an oscillation; and means for computing the rest load We based on the equation:

$$W_e = \frac{W_i g}{g + \Delta g_{(A/L)i} - \Delta g_{(G/L)i}} - \frac{k \cdot y_i \cdot g \cdot (\Delta g_{(A/L)i} - \Delta g_{(G/L)i})}{\{g + \Delta g_{(A/L)i} - \Delta g_{(G/L)i}\}^2}$$

where g is the acceleration due to gravity and k is a spring constant.

19. Dynamic load measurement equipment according to claim 18, wherein said frame body has a hollow interior portion and said structural member comprises a beam, and wherein one edge of said beam is fixed to a fixed part of said frame body in said hollow interior and a free edge part of said beam is opposed to a free edge of said frame body in said hollow interior, said displacement sensor being arranged between said free edge part of said beam and said free edge of said frame body.

20. Dynamic load measurement equipment according to claim 19, wherein said displacement sensor comprises an optical displacement detection sensor.

21. Dynamic load measurement equipment according to claim 20, wherein said displacement sensor comprises a one dimensional position detection element.

22. Dynamic load measurement equipment according to claim 21, wherein said one dimensional position detection element is arranged at said free edge of said beam, said equipment further comprising a light-emitting element arranged on said fixed part of said frame body to irradiate said one dimensional position detection element.

23. Dynamic load measurement equipment according to claim 22, wherein said one dimensional position detection element comprises a semiconductor position sensitive detector.

24. Dynamic load measurement equipment according to claim 23, wherein said means for computing said acceleration $\Delta g_{G/L)i}$ comprises a light-emitting element set up to be moved by said oscillation and a fixed-position one dimensional position detection element detecting a time-varying incident position of a light ray from said light-emitting element.

25. Dynamic load measurement equipment according to claim 24, wherein both said one dimensional position detection element and said light-emitting element directed toward said one dimensional detection element are fixed opposite one another near said free edge of said beam, said equipment further comprising a bar arranged at said free edge of said frame body and inserted into an optical path between said one dimensional position detection element and said light-emitting element, a part of said one dimensional position detection element being masked by said bar.

26. Dynamic load measurement equipment according to claim 25, wherein said bar constitutes part of said means for measuring said acceleration $\Delta g_{G/L)i}$ and wherein said bar oscillates together with said frame body.

* * * * *